US012633740B2

(12) United States Patent
     Takeya et al.

(10) Patent No.: US 12,633,740 B2
(45) Date of Patent: May 19, 2026

(54) VEHICLE BACKUP APPARATUS

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Chikashi Takeya, Yokkaichi (JP); Yuuki Sugisawa, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 18/844,125

(22) PCT Filed: Mar. 7, 2022

(86) PCT No.: PCT/JP2022/009717
     § 371 (c)(1),
     (2) Date: Sep. 5, 2024

(87) PCT Pub. No.: WO2023/170741
     PCT Pub. Date: Sep. 14, 2023

(65) Prior Publication Data
     US 2025/0219401 A1      Jul. 3, 2025

(51) Int. Cl.
     *H02J 1/08*        (2026.01)
     *B60R 16/033*      (2006.01)
     (Continued)

(52) U.S. Cl.
     CPC ............ *H02J 1/086* (2020.01); *B60R 16/033* (2013.01); *H02J 7/345* (2013.01); *H02J 7/80* (2026.01);
     (Continued)

(58) Field of Classification Search
     CPC ........ H02J 1/086; H02J 7/0047; H02J 7/0063; H02J 7/007182; H02J 7/007194;
     (Continued)

(56) References Cited

U.S. PATENT DOCUMENTS

2011/0215654 A1*  9/2011  Kumar .................... H02M 3/06
                                                  307/109
2013/0241466 A1*  9/2013  Mitsuda .............. H01M 10/441
                                                  320/103
(Continued)

FOREIGN PATENT DOCUMENTS

JP      2014-166060 A     9/2014
JP      2016-082764 A     5/2016
        (Continued)

OTHER PUBLICATIONS

International Search Report, Application No. PCT/JP2022/009717, mailed Apr. 26, 2022. ISA/Japan Patent Office.

*Primary Examiner* — Lincoln D Donovan
*Assistant Examiner* — Alex W Lam
(74) *Attorney, Agent, or Firm* — Brooks Kushman P.C.

(57) ABSTRACT

There is provided a vehicle backup apparatus that easily supplies sufficient power to a load when supplying of power from a power supply unit has entered a failure state. In a vehicle power supplying system including a power supply unit that supplies power to a load, a vehicle backup apparatus performs a backup operation when the supplying of power from the power supply unit is in a failure state. The vehicle backup apparatus includes a charging/discharging unit for performing charging and discharging of a backup power supply that includes a battery and a capacitor and is a different power source to the power supply unit; and a control unit for controlling the charging/discharging unit. When the failure state has been entered, the control unit
(Continued)

causes the charging/discharging unit to perform the backup operation so as to supply power based on the battery and the capacitor to the load.

14 Claims, 26 Drawing Sheets

(51) Int. Cl.
| | |
|---|---|
| *H02J 7/00* | (2026.01) |
| *H02J 7/34* | (2006.01) |
| *H02J 7/80* | (2026.01) |
| *H02J 7/90* | (2026.01) |
| *H02J 7/96* | (2026.01) |

(52) U.S. Cl.
CPC ................ *H02J 7/855* (2026.01); *H02J 7/96* (2026.01); *H02J 7/977* (2026.01); *H02J 2207/20* (2020.01); *H02J 2207/50* (2020.01)

(58) Field of Classification Search
CPC .... H02J 7/345; H02J 2207/20; H02J 2207/50; H02J 7/00; H02J 9/061; B60R 16/033; B60L 50/60
See application file for complete search history.

(56) References Cited

U.S. PATENT DOCUMENTS

| | | | |
|---|---|---|---|
| 2014/0081520 A1 | 3/2014 | Sugimoto | |
| 2017/0197565 A1* | 7/2017 | Yoneyama | .......... B60R 16/0238 |
| 2019/0184921 A1* | 6/2019 | Kageyama | ............ H02J 7/0063 |
| 2021/0316680 A1 | 10/2021 | Kambara et al. | |
| 2022/0021233 A1 | 1/2022 | Kambara | |

FOREIGN PATENT DOCUMENTS

| | | |
|---|---|---|
| JP | 2018-050355 A | 3/2018 |
| JP | 2018-090050 A | 6/2018 |
| WO | 2020-045613 A1 | 3/2020 |

* cited by examiner

VEHICLE BACKUP APPARATUS

CROSS-REFERENCE TO RELATED APPLICATIONS

This application is the U.S. national stage of PCT/JP2022/009717 filed on Mar. 7, 2022, the contents of which are incorporated herein.

TECHNICAL FIELD

The present disclosure relates to a vehicle backup apparatus.

BACKGROUND

JP 2013-28295A discloses a vehicle-mounted power supply apparatus that supplies power from a secondary battery installed in a vehicle to vehicle-mounted devices. This vehicle-mounted power supply apparatus is configured to supply power from a secondary battery that differs from the secondary battery mentioned above to some vehicle-mounted equipment devices out of the plurality of vehicle-mounted devices when the voltage supplied to the vehicle-mounted devices has fallen to a set value or below.

Since conventional vehicle-mounted power supply apparatuses are configured to use only a secondary battery as a backup power supply, the amount of power that is supplied to the load (that is, vehicle-mounted devices) is limited. This means that there is a need for a configuration that can easily supply sufficient power to the load during a backup operation.

The present disclosure was completed in view of the situation described above and has an object of providing a vehicle backup apparatus that can easily supply sufficient power to a load when supplying of power from a power supply unit has entered a failure state.

SUMMARY

A vehicle backup apparatus according to an aspect of the present disclosure is a vehicle backup apparatus that performs, in a vehicle power supplying system equipped with a power supply unit that supplies power to a load, a backup operation when supplying of power from the power supply unit has entered a failure state, the vehicle backup apparatus including: a charging/discharging unit for performing charging and discharging of a backup power supply that includes a battery and a capacitor and is a different power source to the power supply unit; and a control unit for controlling the charging/discharging unit, wherein when the failure state has been entered, the control unit causes the charging/discharging unit to perform the backup operation so as to supply power based on the battery and the capacitor to the load.

Advantageous Effects

According to the present disclosure, it is easy to supply sufficient power to a load when supplying of power from a power supply unit has entered a failure state.

DETAILED DESCRIPTION OF PREFERRED EMBODIMENTS

Figure 1:
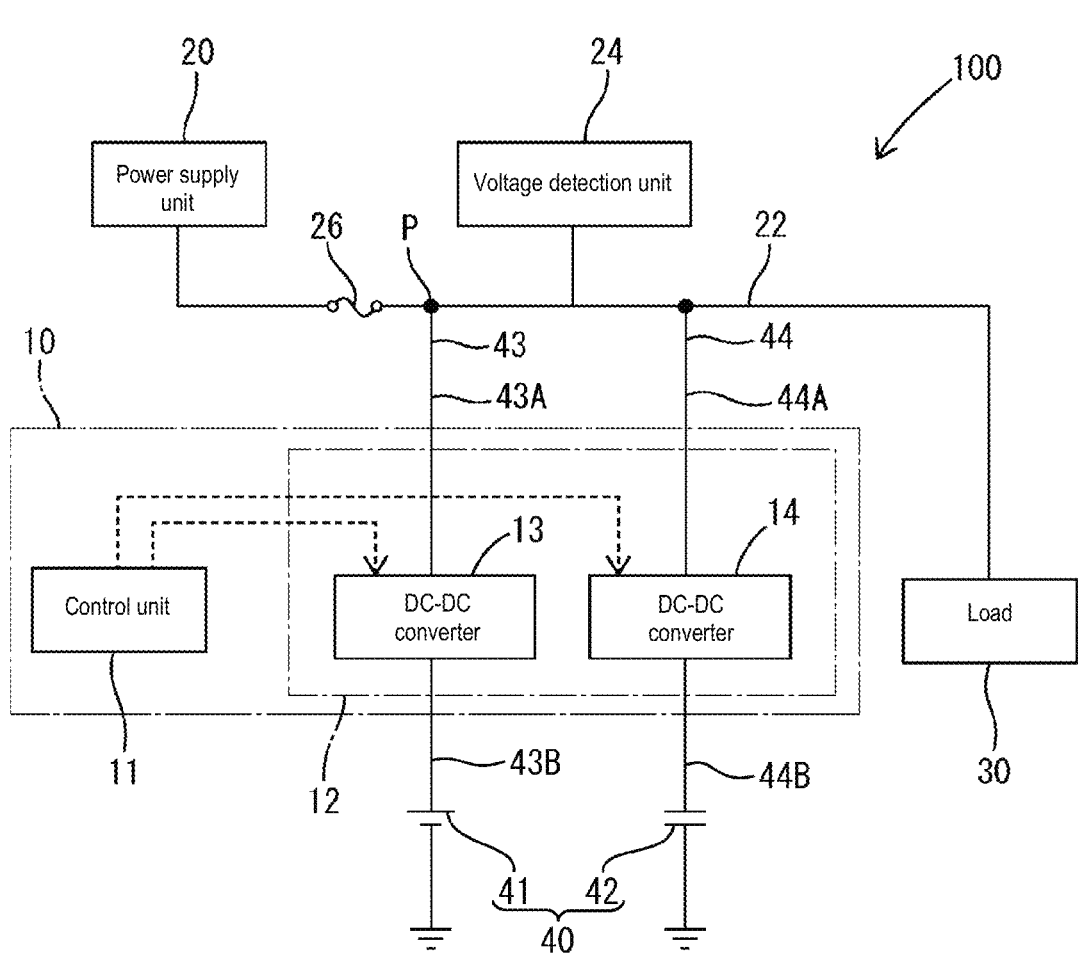
FIG. 1 is a block diagram schematically depicting a vehicle power supplying system including a vehicle backup apparatus according to a first embodiment.

Several embodiments of the present disclosure will first be listed and described in outline. Note that the features described below in (1) to (13) may be combined in any way that is technically consistent.

In a first aspect, a vehicle backup apparatus performs, in a vehicle power supplying system equipped with a power supply unit that supplies power to a load, a backup operation when supplying of power from the power supply unit has entered a failure state, the vehicle backup apparatus including: a charging/discharging unit for performing charging and discharging of a backup power supply that includes a battery and a capacitor and is a different power source to the power supply unit; and a control unit for controlling the charging/discharging unit, wherein when the failure state has been entered, the control unit causes the charging/discharging unit to perform the backup operation so as to supply power based on the battery and the capacitor to the load.

With the vehicle backup apparatus according to the first aspect, it is possible, in a vehicle power supplying system, to perform a backup operation when supplying of power from a power supply unit has entered a failure state so as to supply power based on a battery and a capacitor to a load. This means that compared to a configuration that uses only a battery as a backup power supply, it is possible to also supply power based on a capacitor, which makes it easier to supply sufficient power to the load.

In a second aspect, in the vehicle backup apparatus according to the present disclosure, when the failure state has been entered, the control unit may cause the charging/discharging unit to perform the backup operation so as to supply both power from the battery and power from the capacitor to the load.

In the vehicle backup apparatus according to the second aspect, when the supplying of power from a power supply unit has entered a failure state, it is possible to supply power from both a battery and a capacitor to the load. This means that it is easier to supply sufficient power to the load during a backup operation.

In a third aspect, the vehicle backup apparatus according to the present disclosure may further include a temperature detection unit for detecting a temperature of the battery. When the failure state has been entered and a detection temperature of the temperature detection unit is equal to or below a threshold temperature, the control unit may cause the charging/discharging unit to perform the backup operation so as to supply power from the capacitor to the load and stop supplying of power from the battery to the load, and when the detection temperature exceeds the threshold temperature, the control unit may cause the charging/discharging unit to perform the backup operation so as to supply both power from the battery and power from the capacitor to the load.

With the vehicle backup apparatus according to the third aspect, when the temperature of the battery is equal to or below a threshold temperature and it is estimated that the internal resistance of the battery has increased, it is no longer possible to supply power efficiently from the battery. In this case, it is possible to supply power efficiently by supplying power from a capacitor whose internal resistance can be kept low. On the other hand, when the temperature of the battery exceeds the threshold temperature and the internal resistance of the battery decreases, it becomes easier to supply sufficient power to the load by supplying power from the battery in addition to the capacitor.

In a fourth aspect, the vehicle backup apparatus according to the present disclosure may further include: a power path that acts as a path that supplies power from the power supply unit to the load; a conductive path provided between the power path and the battery; and a current detection unit that detects a current flowing from the battery to the conductive path. When the failure state has been entered and a current value detected by the current detection unit is equal to or below a threshold current, the control unit may cause the charging/discharging unit to perform the backup operation so as to supply power from the battery to the load and stop supplying of power from the capacitor to the load, and when the current value detected by the current detection unit exceeds the threshold current, the control unit may cause the charging/discharging unit to perform the backup operation so as to supply both power from the battery and power from the capacitor to the load.

With the vehicle backup apparatus according to the fourth aspect, when a failure state has been entered and the current value of the current supplied from the battery is equal to or less than the threshold current and it is estimated that the battery is not supplying an excessive current to the load, it is possible to supply power from the battery to the load. On the other hand, if the current value of the current supplied from the battery exceeds the threshold current and it is estimated that the battery is supplying an excessive current to the load, it is possible for the capacitor to start supplying power to the load. By doing so, it is possible to suppress over-discharging of the battery.

In a fifth aspect, the vehicle backup apparatus according to the present disclosure, when the failure state has been entered and a specified load that is set in advance has entered an operating state, the control unit may cause the charging/discharging unit to perform the backup operation so as to supply power from the capacitor to the load.

With the vehicle backup apparatus according to the fifth aspect, the supplying of power from the capacitor can be started based on the specified load being in an operating state. This means that it becomes easier to supply sufficient power from the power source including the capacitor to the specific load without performing special control.

In a sixth aspect, the vehicle backup apparatus according to the present disclosure may further include: a power path that acts as a path that supplies power from the power supply unit to the load; a conductive path provided between the power path and the battery; a current detection unit that detects a current flowing on the conductive path; and a switch that is provided on the conductive path, enables the conductive path to conduct electricity when the switch is in an on state, and cuts off the conductive path when the switch is in an off state. When the failure state has been entered and a value of the current detected by the current detection unit exceeds a predetermined value, the control unit may switch the switch from the on state to the off state.

In the vehicle backup apparatus according to the sixth aspect, when the value of the current detected by the current detection unit exceeds a predetermined value and it is estimated that the battery is being overcharged, the conductive path can be cut off to stop the charging of the battery.

When the value of the current detected by the current detection unit exceeds a predetermined value and it is estimated that the battery is being overdischarged, the conductive path can be cut off to stop the discharging of the battery.

In a seventh aspect, the vehicle backup apparatus according to the present disclosure may further include a power path that acts as a path that supplies power from the power supply unit to the load. The charging/discharging unit may include a first DC-DC converter provided between the power path and the battery and a second DC-DC converter provided between the power path and the capacitor.

In the vehicle backup apparatus according to the seventh aspect, by an operation of the first DC-DC converter, it is possible to control the charging voltage or discharging voltage of the battery to a desired level. It is also possible by an operation of the first DC-DC converter to cut off the connection between the battery and the power path to stop charging or discharging of the battery. By an operation of the second DC-DC converter, it is possible to control the charging voltage or discharging voltage of the capacitor to a desired level. It is also possible by an operation of the second DC-DC converter to cut off the connection between the capacitor and the power path and thereby stop the charging or discharging of the capacitor.

In an eighth aspect, the vehicle backup apparatus according to the present disclosure may further include: a power path that supplies power from the power supply unit to the load; and a conductive path provided between the power path and the battery. The charging/discharging unit may include a DC-DC converter provided between the power path and the capacitor, and the battery may be connected via the conductive path to the power path.

In the vehicle backup apparatus according to the eighth aspect, by an operation of the DC-DC converter, it is possible to control the charging voltage or discharging voltage of the capacitor to a desired level. It is also possible by an operation of the DC-DC converter to cut off the connection between the capacitor and the power path, thereby stopping the charging or discharging of the capacitor. On the other hand, since the battery is connected to the power path via a conductive path, it is possible to simplify the configuration compared to a configuration in which a DC-DC converter is provided between the battery and the power path.

In a ninth aspect, the vehicle backup apparatus according to the present disclosure, the backup power supply may include a plurality of capacitors. The charging/discharging unit may include a selection unit that selects the capacitors to supply power to the load out of the plurality of capacitors. The control unit may control the selection unit.

In the vehicle backup apparatus according to the ninth aspect, it is possible to select the capacitors that are to supply power to a load out of a plurality of capacitors, which makes it possible to supply a desired amount of power to the load.

In a tenth aspect, the vehicle backup apparatus according to the present disclosure, the selection unit may select a first selection type that selects a predetermined number of the capacitors and a second selection type that selects a plurality of capacitors in a configuration where a larger number of capacitors than in the first selection type are connected in series. The control unit may cause to perform the backup operation based on power from the capacitors selected by the selection unit according to the first selection type and then cause to perform the backup operation performed based on power from the plurality of capacitors selected by the selection unit according to the second selection type to increase an output voltage outputted from the backup power supply.

With the vehicle backup apparatus according to the tenth aspect, even when the output voltage has fallen due to the supplying of power from the capacitors selected according to the first selection type, by supplying power from a plurality of capacitors selected according to the second selection type, it is possible to supply power while suppressing the fall in the output voltage of the selected capacitors.

In an eleventh aspect, in the vehicle backup apparatus according to the present disclosure, the control unit may cause the charging/discharging unit to charge the capacitor based on power from the battery.

With the vehicle backup apparatus according to the eleventh aspect, it is easy to maintain the charge level of the capacitor.

In a twelfth aspect, in the vehicle backup apparatus according to the present disclosure, the control unit may cause the charging/discharging unit to charge the capacitor based on power from the battery during a period where supplying of power from the capacitor to a specified load, which is set in advance, has stopped.

With the vehicle backup apparatus according to the twelfth aspect, since the charge level of a capacitor decreases when power is supplied from the capacitor to a load, by charging the capacitor based on power from the battery, it becomes easier to ensure the charge level of the capacitor.

In a thirteenth aspect, the vehicle backup apparatus according to the present disclosure may further include a voltage detection unit for detecting an output voltage of the capacitor. When a voltage detected by the voltage detection unit is equal to or below the threshold voltage, the control unit may cause the charging/discharging unit to charge the capacitor based on power from the battery.

With the vehicle backup apparatus according to the thirteenth aspect, when the voltage detected by the voltage detection unit falls to a threshold voltage or below and it is estimated that the charge level of the capacitor has decreased, it is possible to charge the capacitor based on power from the battery. This means that the decrease in the charge level of the capacitor can be efficiently suppressed.

Configuration of Vehicle Power Supplying System

A vehicle power supplying system 100 depicted in FIG. 1 includes a power supply unit 20, a load 30, a backup power supply 40, and a vehicle backup apparatus 10.

The power supply unit 20 functions as a main power source that continuously supplies power when the vehicle in which the vehicle power supplying system 100 is mounted has been started. The power supply unit 20 is a DC power supply that generates a DC voltage. The power supply unit 20 is composed of a battery, such as a lead acid battery. A high-potential terminal of the power supply unit 20 is electrically connected to a power path 22, and a low-potential terminal of the power supply unit 20 is electrically connected to ground. The power supply unit 20 applies a predetermined voltage to the power path 22. In the present specification, unless otherwise specified, the expression "voltage" refers to a voltage relative to ground.

The power supply unit 20 is electrically connected via the power path 22 to the load 30. Power from the power supply unit 20 is supplied via the power path 22 to the load 30. A voltage detection unit 24 is provided on the power path 22. In more detail, the voltage detection unit 24 is provided on the power path 22 at a position closer to the load 30 than a connection point P. The connection point P is a connection point between the power path 22 and a conductive path 43A, described later. The voltage detection unit 24 detects the voltage on the power path 22. A fuse 26 with a function of cutting off the conduction of electricity on the power path 22 is provided on the power path 22 at a position that is closer to the power supply unit 20 than the connection point P. Note that the power path 22 may also be provided with a relay or the like, not illustrated.

The load 30 is a vehicle-mounted electrical device. The load 30 is a load for which it is desirable to supply power even in an abnormal state (or "failure state") where the supplying of power from the power supply unit 20 has stopped. As one example, the load 30 may be an actuator, such as a motor. Alternatively, the load 30 may be an ECU or actuator in an electric parking brake system, or an ECU, actuator, or the like in a shift-by-wire control system. The load 30 may also be a vehicle-mounted electrical device aside from the examples given above.

The backup power supply 40 is a power source (or "auxiliary power source") that differs from the power supply unit 20. This backup power supply 40 includes a battery 41 and a capacitor 42. The battery 41 is a DC power supply that outputs a DC voltage, such as a lithium ion battery. The capacitor 42 is a DC power supply that outputs a DC voltage, such as an electric double-layer capacitor.

The battery 41 is electrically connected via the conductive path 43 to the power path 22, and is charged and discharged via the conductive path 43. The conductive path 43 is provided between the power path 22 and the battery 41. The conductive path 43 is provided with a DC-DC converter 13, which will be described later. The conductive path 43 includes a conductive path 43A and a conductive path 43B. The conductive path 43A is electrically connected to the power path 22 and the DC-DC converter 13. The conductive path 43A becomes the same potential as the power path 22. A high-potential terminal of the battery 41 is electrically connected to the conductive path 43B and becomes the same potential as the conductive path 43B. A low-potential terminal of the battery 41 is electrically connected to ground and becomes the same potential as ground. The charge voltage (or "output voltage") of the battery 41 is the voltage applied to the conductive path 43B.

The capacitor 42 is electrically connected via a conductive path 44 to the power path 22, and is charged and discharged via the conductive path 44. The conductive path 44 is provided between the power path 22 and the capacitor 42. The conductive path 44 is provided with a DC-DC converter 14, which will be described later. The conductive path 44 includes a conductive path 44A and a conductive path 44B. The conductive path 44A is electrically connected to the power path 22 and the DC-DC converter 14. The conductive path 44A becomes the same potential as the power path 22. A high-potential electrode of the capacitor 42 is electrically connected to the conductive path 44B and becomes the same potential as the conductive path 44B. The low-potential electrode of the capacitor 42 is electrically connected to ground and becomes the same potential as ground. A charge voltage (or "output voltage") of the capacitor 42 is the voltage applied to the conductive path 43B.

The vehicle backup apparatus 10 performs a backup operation when the supplying of power from the power supply unit 20 has entered a failure state. The vehicle backup apparatus 10 includes a control unit 11 and a charging/discharging unit 12.

The charging/discharging unit 12 charges and discharges the backup power supply 40. The charging/discharging unit

12 includes the DC-DC converter 13 and the DC-DC converter 14. The DC-DC converter 13 corresponds to a "first DC-DC converter" for the present disclosure. The DC-DC converter 14 corresponds to a "second DC-DC converter" for the present disclosure. The DC-DC converter 13 functions as a voltage converter circuit. The DC-DC converter 13 performs charging operations and discharging operations for the battery 41. As a charging operation, the DC-DC converter 13 performs a voltage conversion operation of stepping up or stepping down the voltage applied to the conductive path 43A and applying the resulting voltage to the conductive path 43B. As a discharging operation, the DC-DC converter 13 performs a voltage conversion operation of stepping up or stepping down the voltage applied to the conductive path 43B and applying the resulting voltage to the conductive path 43A.

The DC-DC converter 14 functions as a voltage converter circuit. The DC-DC converter 14 performs charging operations and discharging operations for the capacitor 42. As a charging operation, the DC-DC converter 14 performs a voltage conversion operation of stepping up or stepping down the voltage applied to the conductive path 44A and applying the resulting voltage to the conductive path 44B. As a discharging operation, the DC-DC converter 14 performs a voltage conversion operation of stepping up or stepping down the voltage applied to the conductive path 44B and applying the resulting voltage to the conductive path 44A.

The control unit 11 is an information processing device with an information processing function, a computation function, a control function, and the like. The control unit 11 is mainly composed of a microcomputer, for example, and includes a computational device such as a CPU (Central Processing Unit), a memory such as a ROM (Read Only Memory) or a RAM (Random Access Memory), an A/D converter, and the like. The control unit 11 includes a function of controlling the charging/discharging unit 12.

The control unit 11 causes the charging/discharging unit 12 to perform an operation of supplying power from the power supply unit 20 to the load 30, the battery 41, and the capacitor 42. The control unit 11 causes the charging/discharging unit 12 to perform a backup operation to supply power based on the battery 41 and the capacitor 42 to the load 30. The control unit 11 operates the charging/discharging unit 12 to charge the capacitor 42 based on power from the battery 41.

In the vehicle backup apparatus 10, when the vehicle in which the vehicle power supplying system 100 has been installed is in a stopped state where the starter switch is in an off state, the charge voltage (or "output voltage") of the battery 41 and the capacitor 42 is kept at or below a standby voltage. When the starter switch of the vehicle is switched to an on state, the vehicle backup apparatus 10 charges the battery 41 and the capacitor 42 so that the charge voltages of the battery 41 and the capacitor 42 reach or exceed a target voltage that is higher than the standby voltage. When the starter switch of the vehicle is in the on state and the supplying of power from the power supply unit 20 is not in the failure state, the charge voltages of the battery 41 and the capacitor 42 are kept at the target voltage. When the starter switch of the vehicle is switched from the on state to the off state, the vehicle backup apparatus 10 discharges the battery 41 and the capacitor 42 until the charge voltages of the battery 41 and the capacitor 42 become equal to or lower than the standby voltage.

Operation of Vehicle Backup Apparatus

Figure 2:
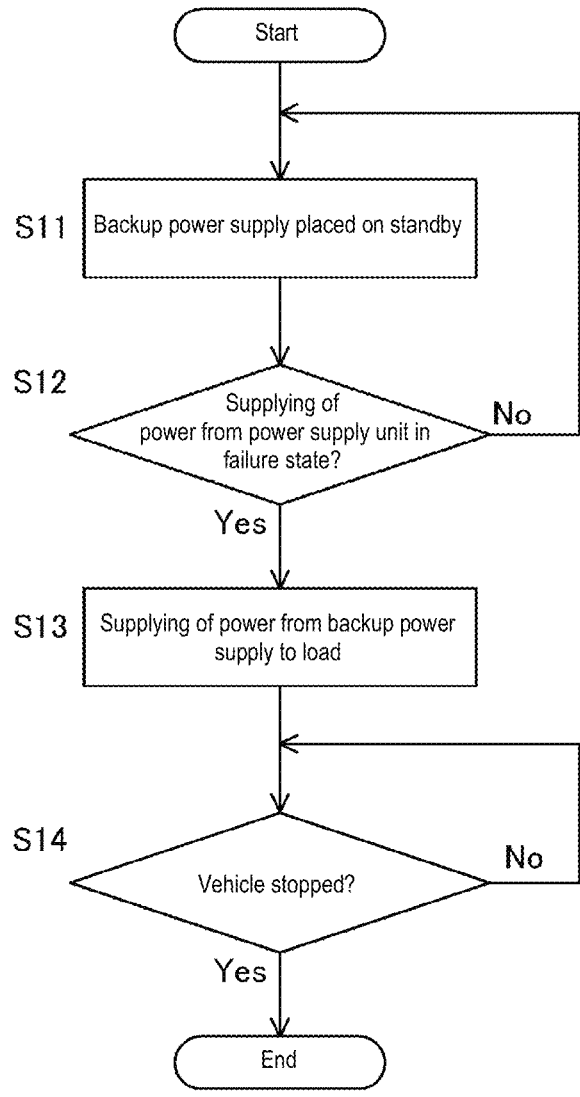
FIG. 2 is a flowchart depicting a flow of control performed by a vehicle backup apparatus according to the first embodiment.

FIG. 2 depicts an example of backup control performed by the vehicle backup apparatus 10 (more specifically, the control unit 11). The control unit 11 starts the backup control in FIG. 2 when a predetermined start condition is met. As one example, the condition for starting the backup control in FIG. 2 may be the starter switch of the vehicle in which the vehicle power supplying system 100 is installed being switched from the off state to the on state, or may be a different condition. In the representative example described below, when the starter switch of the vehicle has been switched from the off state to the on state, a start signal indicating that the starter switch has switched to the on state is provided to the control unit 11 from an external device (for example, an external ECU (Electronic Control Unit)). When a start signal like this has been received, the control unit 11 starts the backup control in FIG. 2.

Figure 3:
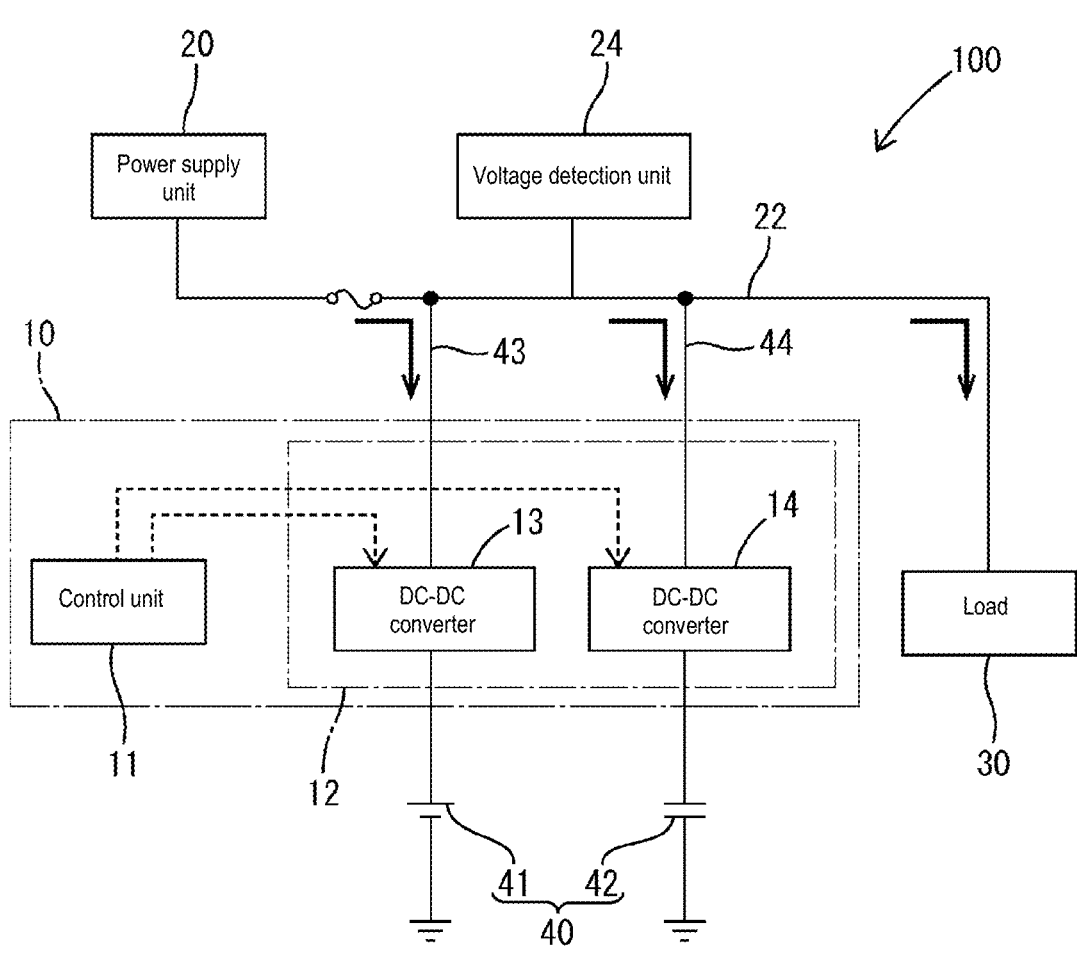
FIG. 3 is a diagram for describing a charging operation of a backup power supply in the vehicle power supplying system in the first embodiment.

When the backup control in FIG. 2 has started, in step S11, the control unit 11 places the backup power supply 40 in a standby state. As one example, as depicted in FIG. 3, the control unit 11 supplies power from the power supply unit 20 to the load 30 and also supplies power from the power supply unit 20 to the battery 41 and the capacitor 42. The control unit 11 charges the battery 41 and capacitor 42 so that their charge voltages become equal to or higher than the target voltage that is higher than the standby voltage. The control unit 11 keeps the charge voltages of the battery 41 and the capacitor 42 at the target voltage described above.

In step S12, the control unit 11 determines whether the supplying of power from the power supply unit 20 is in a failure state. One example of a failure state for the supplying of power from the power supply unit 20 is a case where the voltage on the power path 22 that supplies power from the power supply unit 20 has become a threshold voltage or lower. As one example, the threshold voltage is a fixed value that is lower than the output voltage of the power supply unit 20 when fully charged. However, the threshold voltage may be changeable. The control unit 11 determines whether the output voltage of the power supply unit 20 has fallen. As one example, the control unit 11 determines whether the voltage on the power path 22 is lower than a threshold based on a voltage detected by the voltage detection unit 24. This threshold is a value that is significantly lower than the output voltage that the power supply unit 20 applies to the power path 22 during normal operation, and is a value that is greater than zero. If the control unit 11 has determined in step S12 that the voltage on the power path 22 is below the threshold ("Yes" in step S12), the processing proceeds to step S13. If the control unit 11 has determined in step S12 that the voltage on the power path 22 is equal to or greater than the threshold ("No" in step S12), the processing in step S11 is performed again.

As one example, when the supplying of power from the power supply unit 20 is in the failure state, the control unit 11 cuts off the part of the power path 22 that is closer to the power supply unit 20 than the connection point P. As one example, the control unit 11 places the fuse 26 in a cutoff state or places a switch, such as a relay, that is separately provided in a cutoff state. Accordingly, an abnormal state is entered in which a ground fault or disconnection has occurred in the power path 22, and the supplying of power from the power supply unit 20 to the load 30 is interrupted and the voltage on the power path 22 becomes approximately 0 V. In this case, in the vehicle backup apparatus 10, the control unit 11 performs a backup operation that supplies power to the load 30 based on the power from the battery 41 and the capacitor 42.

Figure 4:
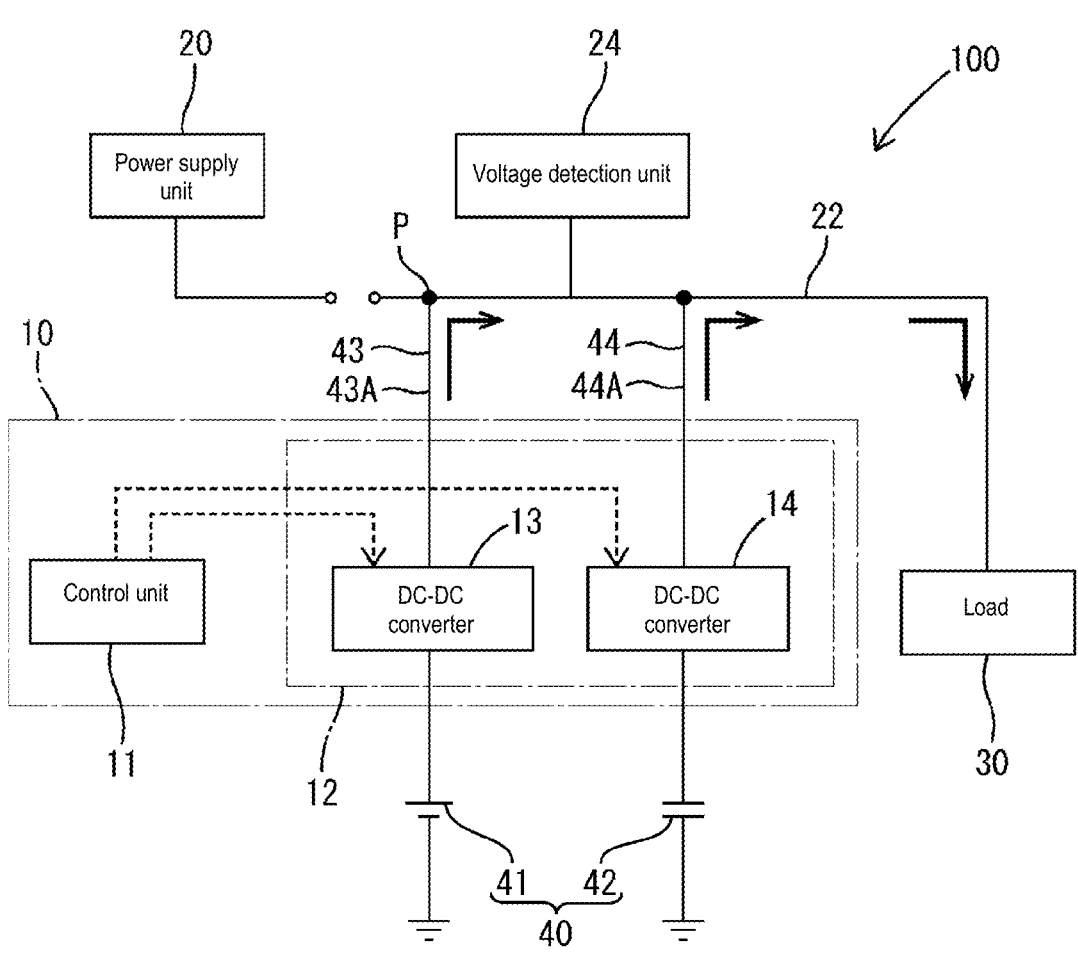
FIG. 4 is a diagram for describing a backup operation in the vehicle power supplying system in the first embodiment.

If it has been determined in step S12 that the voltage on the power path 22 is below the threshold ("Yes" in step S12), as depicted in FIG. 4, in step S13 the control unit 11 causes the backup power supply 40 to supply power to the load 30. The control unit 11 causes the charging/discharging unit 12 to perform a backup operation that supplies power from the backup power supply 40 to the power path 22. The control unit 11 causes the charging/discharging unit 12 to perform the backup operation so that power is supplied based on the battery 41 and the capacitor to the load 30. In more detail, the control unit 11 causes the charging/discharging unit 12 to perform the backup operation so as to supply both power from the battery 41 and power from the capacitor 42 to the load 30. The control unit 11 applies a voltage obtained by the DC-DC converter 13 stepping up or stepping down the output voltage of the battery 41 to the conductive path 43A (the power path 22). The control unit 11 applies a voltage obtained by the DC-DC converter 14 stepping up or stepping down the output voltage of the capacitor 42 to the conductive path 44A (the power path 22).

Next in step S14, the control unit 11 determines whether the vehicle in which the vehicle power supplying system 100 is installed is in a stopped state. The control unit 11 determines whether the starter switch of the vehicle in which the vehicle power supplying system 100 is installed has been switched from the on state to the off state. As one example, when the starter switch of the vehicle has switched from the on state to the off state, a start signal indicating that the starter switch has switched to the off state is provided to the control unit 11 from an external device (as one example, an external ECU (Electronic Control Unit)). When a start signal like this has been received, the control unit 11 determines that the vehicle is in the stopped state. The control unit 11 repeats the processing in step S14 until it is determined that the vehicle is in the stopped state (which is not the start state). On determining in step S14 that the vehicle is in the stopped state ("Yes" in step S14), the control unit 11 ends the backup control in FIG. 2.

Effects of First Embodiment

With the vehicle power supplying system 100 according to the first embodiment, if the supplying of power from the power supply unit 20 has entered a failure state, a backup operation can be performed to supply power based on the battery 41 and the capacitor 42 to the load 30. This means that compared to a configuration where only the battery 41 is used as the backup power supply 40, it is possible to also supply power based on the capacitor 42, which makes it easier to supply sufficient power to the load 30. In addition, the battery 41, which has a comparatively large charging capacity, and the capacitor 42, which has a relatively large output voltage, can be used together, which results in a backup power supply 40 with a large capacity and a high output.

When the supplying of power from the power supply unit 20 has entered a failure state, power can be supplied to the load 30 from both the battery 41 and the capacitor 42. This makes it easier to supply sufficient power to the load 30 during a backup operation.

Operating the DC-DC converter 13 makes it possible to control the charging voltage or discharging voltage of the battery 41 to a desired level. By an operation of the DC-DC converter 13, the connection between the battery 41 and the power path 22 can be cut off, thereby stopping the charging or discharging of the battery 41. Operating the DC-DC converter 14 makes it possible to control the charging voltage or discharging voltage of the capacitor 42 to a desired level. Also, by an operation of the DC-DC converter 14, the connection between the capacitor 42 and the power path 22 can be cut off, thereby stopping the charging or discharging of the capacitor 42.

Second Embodiment

A vehicle power supplying system 200 according to the second embodiment differs from the first embodiment in that the power source that supplies power to the load 30 is switched during a backup operation based on the temperature of the battery 41, but is otherwise the same as the first embodiment. Note that components that are the same as in the first embodiment have been assigned the same reference numerals and detailed description thereof is omitted.

Configuration of Vehicle Power Supplying System

Figure 5:
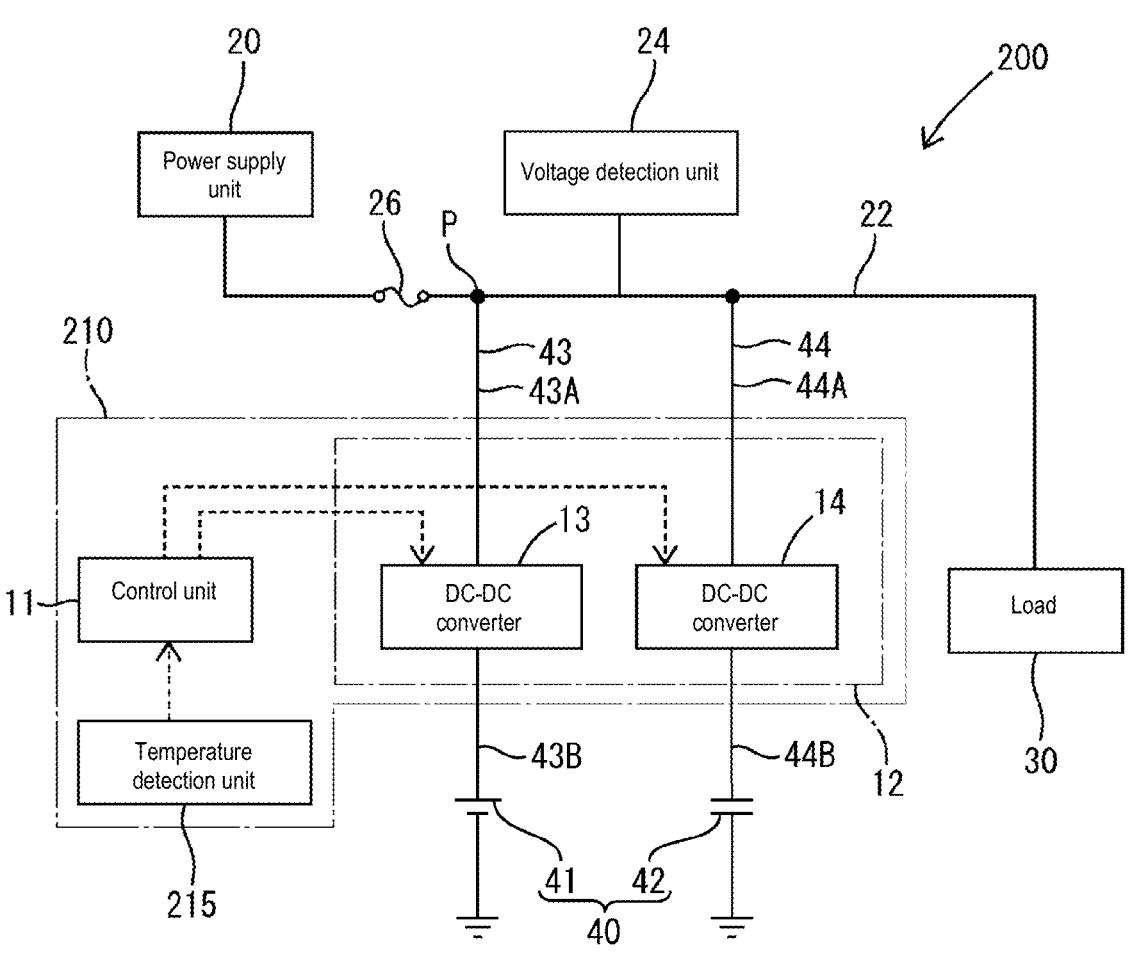
FIG. 5 is a block diagram schematically depicting a vehicle power supplying system in a second embodiment.

As depicted in FIG. 5, the vehicle power supplying system 200 includes a vehicle backup apparatus 210. The vehicle backup apparatus 210 includes the control unit 11, the charging/discharging unit 12, and a temperature detection unit 215. The temperature detection unit 215 is composed of a temperature sensor, such as a thermistor. The temperature detection unit 215 detects the temperature of the battery 41. As examples, the expression "the temperature of the battery 41" here refers to the surface temperature of the battery 41, the temperature near the surface of the battery 41, or an internal temperature of the battery 41. The detected temperature detected by the temperature detection unit 215 is inputted into the control unit 11 as a signal (or "detection signal") that specifies the detected temperature.

When the supplying of power from the power supply unit 20 has entered the failure state and the detected temperature of the temperature detection unit 215 is at or below a threshold temperature, the control unit 11 causes the charging/discharging unit 12 to perform a backup operation that supplies power from the capacitor 42 to the load 30 and stops the supplying of power from the battery 41 to the load 30. On the other hand, when the temperature detected by the temperature detection unit 215 exceeds the threshold temperature, the control unit 11 causes the charging/discharging unit 12 to perform a backup operation that supplies power from both power from the battery 41 and power from the capacitor 42 to the load 30.

Operation of Vehicle Backup Apparatus

Figure 6:
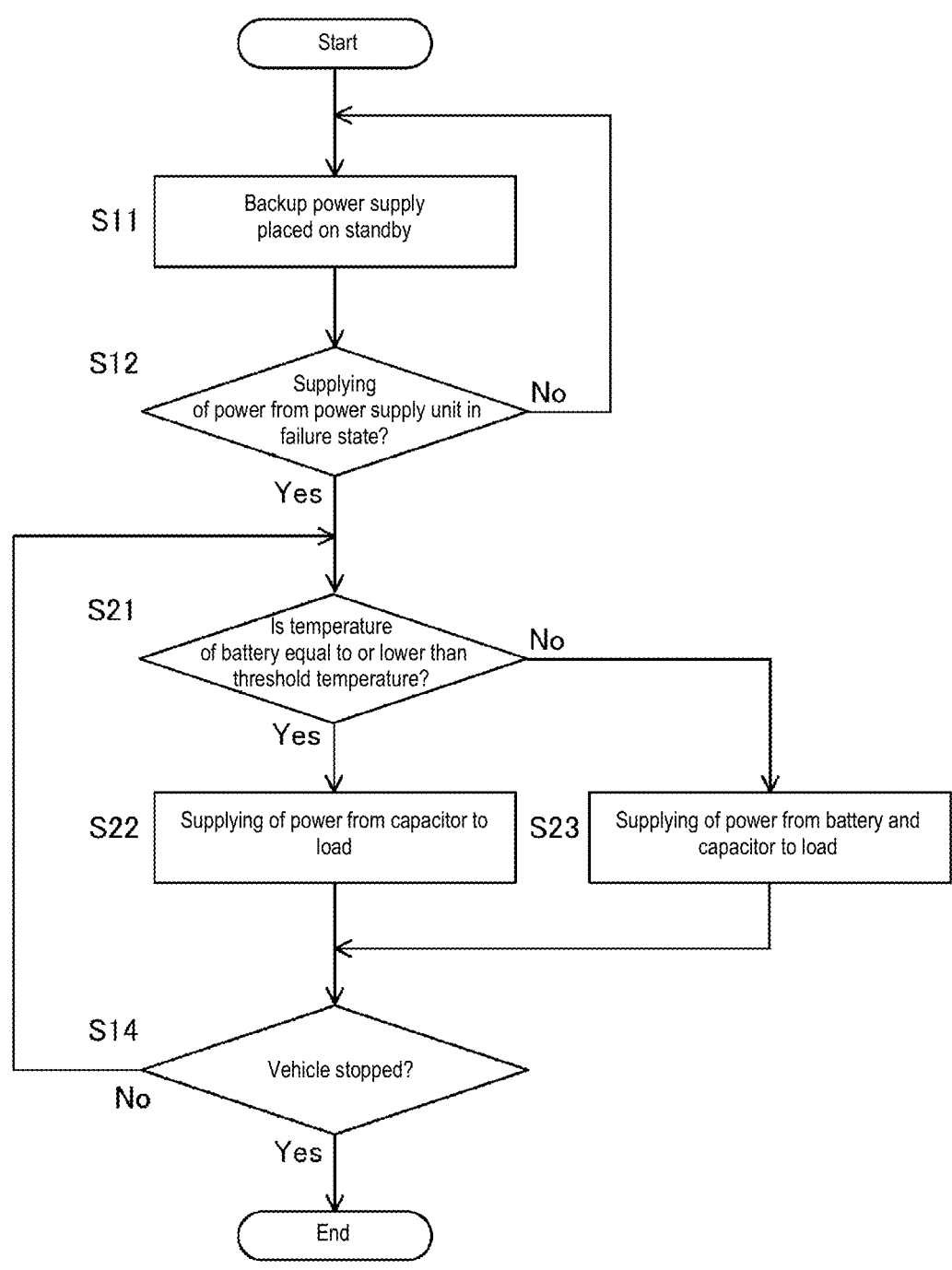
FIG. 6 is a flowchart depicting a flow of control performed by a vehicle backup apparatus according to the second embodiment.

FIG. 6 depicts one example of backup control performed by the vehicle backup apparatus 210 (specifically, the control unit 11). The backup control performed by the vehicle backup apparatus 210 (specifically, the control unit 11) according to the second embodiment differs from the first embodiment in steps S21 to S23.

In the same way as in the first embodiment, the control unit 11 performs the same processing as steps S11 and S12 after the conditions for starting backup control have been met. When it has been determined in step S12 that the supplying of power from the power supply unit 20 is in the failure state, next in step S21, the control unit 11 determines whether the temperature of the battery 41 (which is the temperature detected by the temperature detection unit 215) is equal to or lower than the threshold temperature. As one example, the threshold temperature is a fixed value (for example, 0° C.) that is lower than room temperature (for example, 25° C.). However, the threshold temperature may be changeable.

Figure 7:
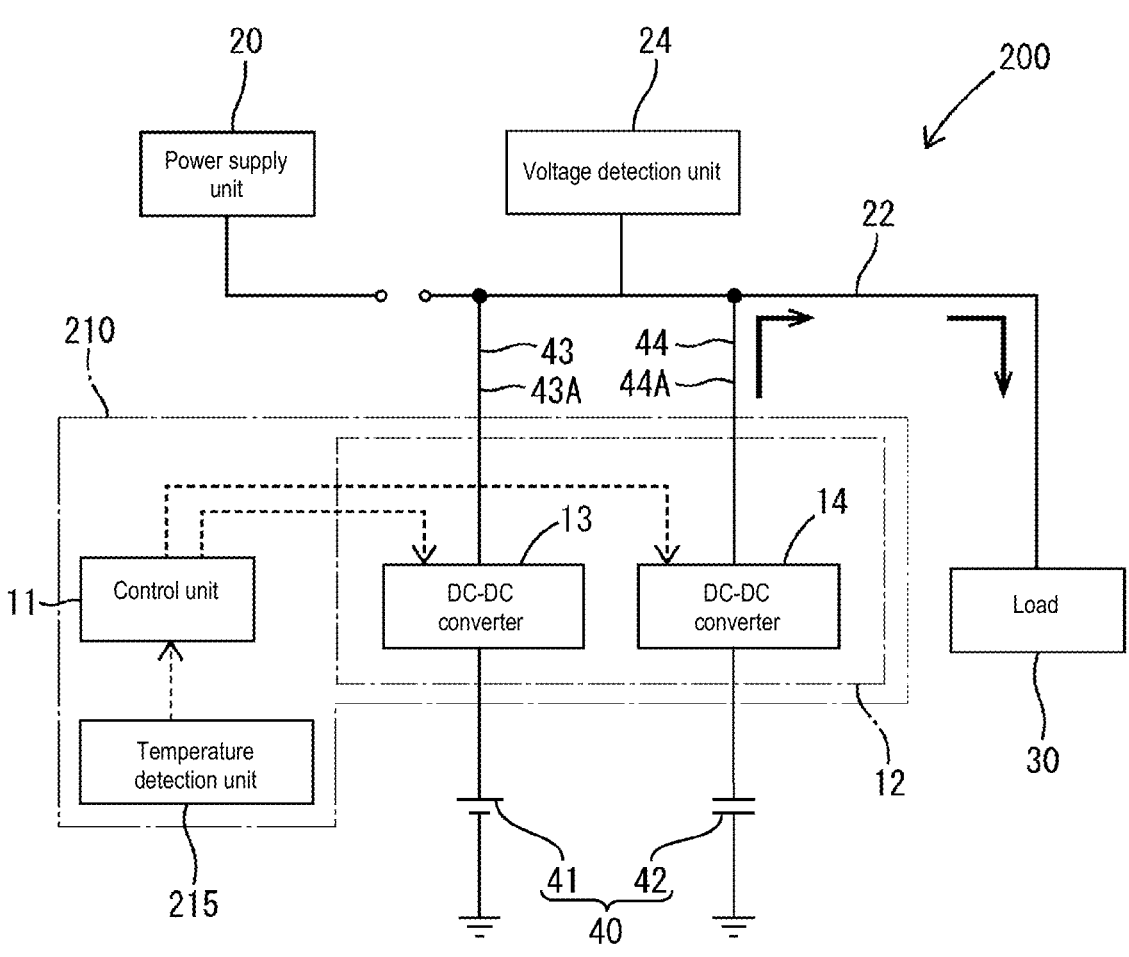
FIG. 7 is a diagram for describing an operation that supplies power from a capacitor to a load in the vehicle power supplying system in the second embodiment.

When it has been determined that the temperature of the battery 41 is equal to or lower than the threshold temperature ("Yes" in step S21), as depicted in FIG. 7, the control unit

11 supplies power from the capacitor 42 to the load 30 (step S22). In more detail, the control unit 11 causes the charging/discharging unit 12 to perform a backup operation that supplies power from the capacitor 42 to the load 30 and stops the supplying of power from the battery 41 to the load 30. The control unit 11 stops the operation of the DC-DC converter 13 and causes the DC-DC converter 14 to apply a voltage obtained by stepping up or stepping down the output voltage of the capacitor 42 to the conductive path 44A (the power path 22).

Figure 8:
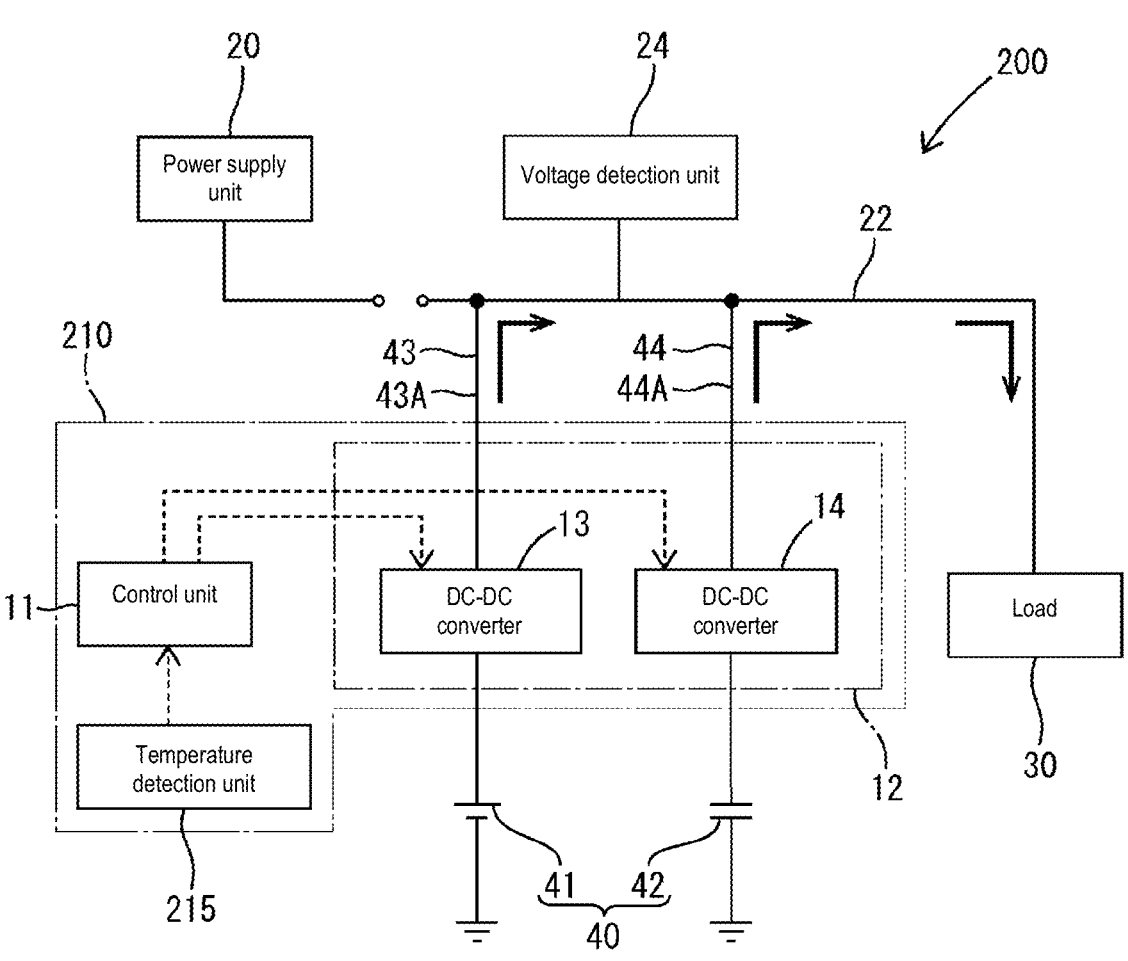
FIG. 8 is a diagram for describing an operation that supplies power from a battery and a capacitor to a load in the vehicle power supplying system in the second embodiment.

When it has been determined that the temperature of the battery 41 is not equal to or lower than the threshold temperature (that is, the temperature exceeds the threshold temperature) ("No" in step S21), as depicted in FIG. 8, the control unit 11 supplies power from both the battery 41 and the capacitor 42 to the load 30 (step S23). In more detail, the control unit 11 causes the charging/discharging unit 12 to perform a backup operation that supplies both power from the battery 41 and power from the capacitor 42 to the load 30. The control unit 11 applies a voltage obtained by the DC-DC converter 13 stepping up or stepping down the output voltage of the battery 41 to the conductive path 43A (the power path 22). The control unit 11 applies a voltage obtained by the DC-DC converter 14 stepping up or stepping down the output voltage of the capacitor 42 to the conductive path 44A (the power path 22).

After steps S22 and S23, in step S14, the control unit 11 performs the same processing as step S14 in the first embodiment. If it has been determined that the vehicle is not in the stopped state (that is, the vehicle is in the started state) ("No" in step S14), the control unit 11 performs the processing in step S21 again. On the other hand, when it has been determined in step S14 that the vehicle is in the stopped state (that is, not the started state) ("Yes" in step S14), the control unit 11 ends the backup control in FIG. 2.

Effects of Second Embodiment

In the vehicle power supplying system 100 according to the second embodiment, when the temperature of the battery 41 has fallen to or below the threshold temperature and it is estimated that the internal resistance of the battery 41 has increased, it is no longer possible to efficiently supply power from the battery 41. In this case, power can be efficiently supplied by supplying power from the capacitor 42 whose internal resistance can be kept low. This provides even more reason to not use the battery 41, which cannot efficiently supply power. On the other hand, when the temperature of the battery 41 exceeds the threshold temperature and the internal resistance of the battery 41 is low, it becomes easier to supply sufficient power to the load by supplying power from the battery 41 in addition to the capacitor 42.

Third Embodiment

A vehicle power supplying system 300 according to the third embodiment differs from the first embodiment in that the power source that supplies power to the load is switched during a backup operation based on the magnitude of the current flowing from the battery 41 to the power path 22, but is otherwise the same as the first embodiment. Note that components that are the same as in the first embodiment have been assigned the same reference numerals and detailed description thereof is omitted.

Configuration of Vehicle Power Supplying System

Figure 9:
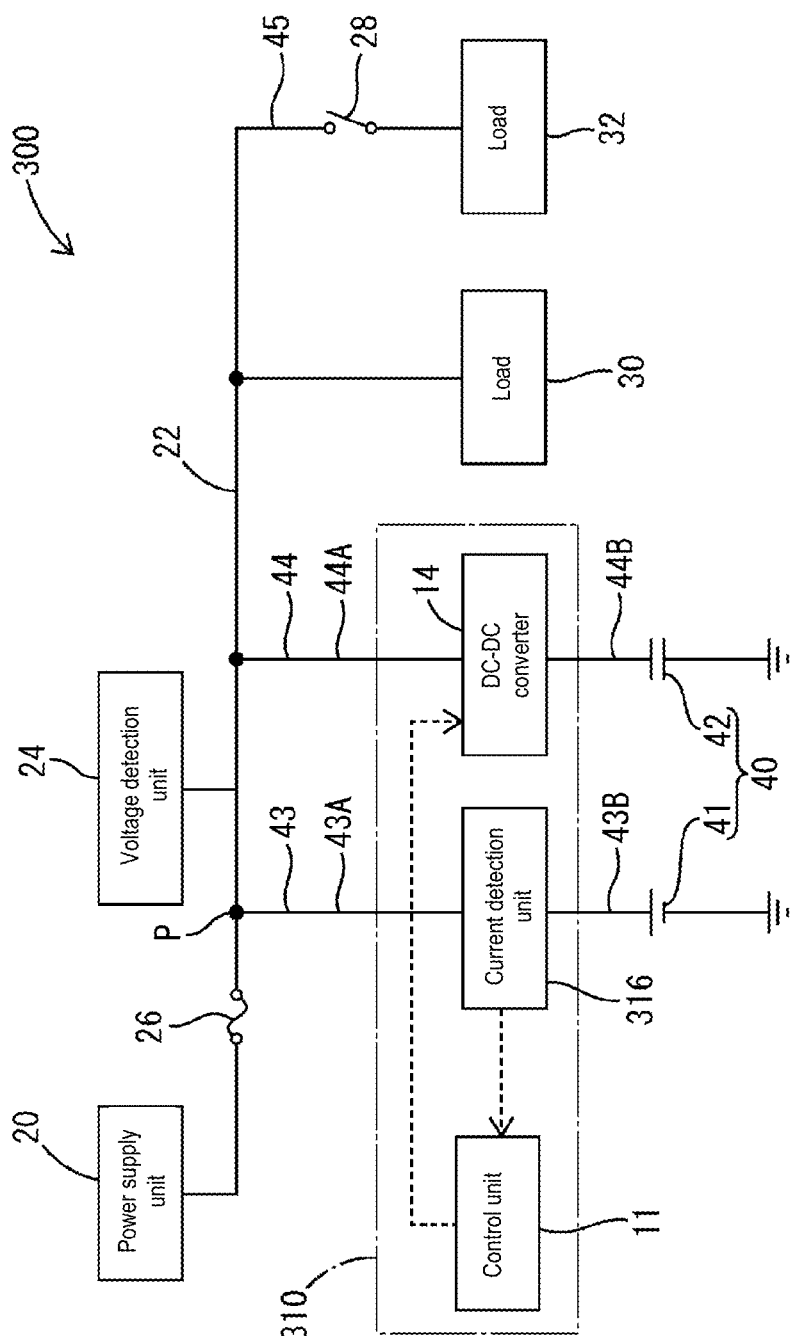
FIG. 9 is a block diagram schematically depicting a vehicle power supplying system in a third embodiment.

As depicted in FIG. 9, the vehicle power supplying system 300 includes a load 32 in addition to the load 30. The loads 30 and 32 are electrically connected to the power path 22. As examples, the load 30 is an ECU and/or various vehicle-mounted sensors. As one example, the load 32 is an electric parking brake system. The load 32 is a load for which it is desirable to supply power even in an abnormal state (or "failure state") where the supplying of power from the power supply unit 20 has stopped. As one example, the load 32 consumes more power per unit time than the load 30. The load 32 is connected to the power path 22 via a conductive path 45. A switch 28 composed of a MOSFET for example is provided on the conductive path 45. The switch 28 switches the conductive state of the conductive path 45 between an on state and an off state under the control of the control unit 11 or the like. As one example, the load 32 is placed in a stopped state when the switch 28 is in the off state, and is placed in an operating state when the switch 28 is in the on state.

As depicted in FIG. 9, the vehicle power supplying system 300 includes a vehicle backup apparatus 310. The vehicle backup apparatus 310 includes the control unit 11, the DC-DC converter 14, and a current detection unit 316. The DC-DC converter 14 corresponds to one example of a "charging/discharging unit" for the present disclosure. Unlike the first embodiment, the vehicle backup apparatus 310 does not include the DC-DC converter 13. The current detection unit 316 is provided on the conductive path 43. The current detection unit 316 detects the current value of the output current of the battery 41 flowing on the conductive path 43. The current detection unit 316 is configured as a current detection circuit using, as examples, a current transformer and/or a shunt resistor.

If, when the failure state has occurred, the current value detected by the current detection unit 316 is equal to or less than a threshold current, the control unit 11 causes the DC-DC converter 14 to perform a backup operation that supplies power from the battery 41 to the load 30 and stops the supplying of power from the capacitor 42 to the load 30. If the current value detected by the current detection unit 316 exceeds the threshold current, the control unit 11 causes the DC-DC converter 14 to perform a backup operation that supplies power from both the battery 41 and the capacitor 42 to the loads 30 and 32.

Operation of Vehicle Backup Apparatus

Figure 10:
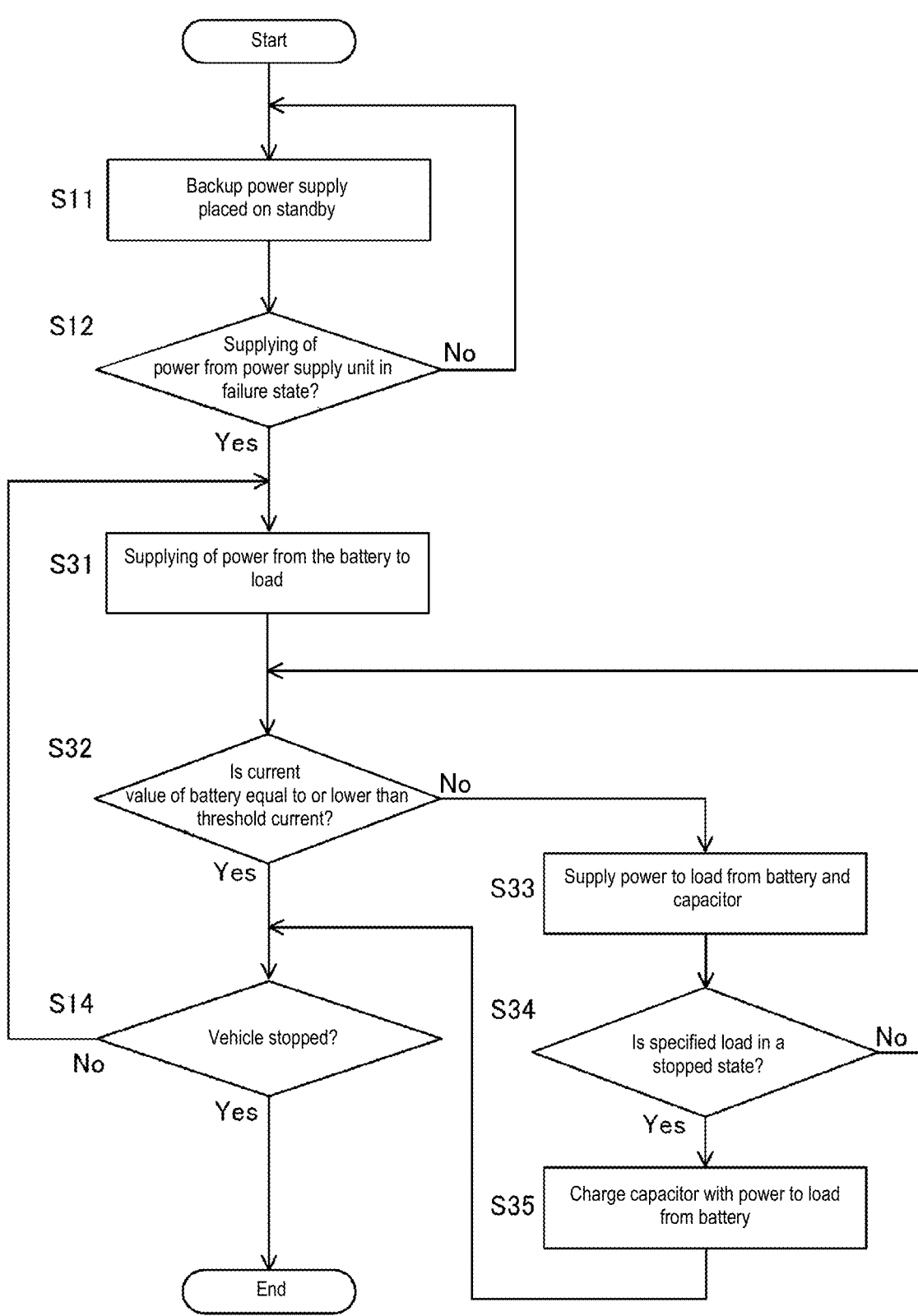
FIG. 10 is a flowchart depicting a flow of control performed by a vehicle backup apparatus according to the third embodiment.

FIG. 10 depicts one example of backup control performed by the vehicle backup apparatus 310 (specifically, the control unit 11). The backup control performed by the vehicle backup apparatus 310 (specifically, the control unit 11) according to the third embodiment differs from the control in the first embodiment in steps S31 to S35.

Figure 11:
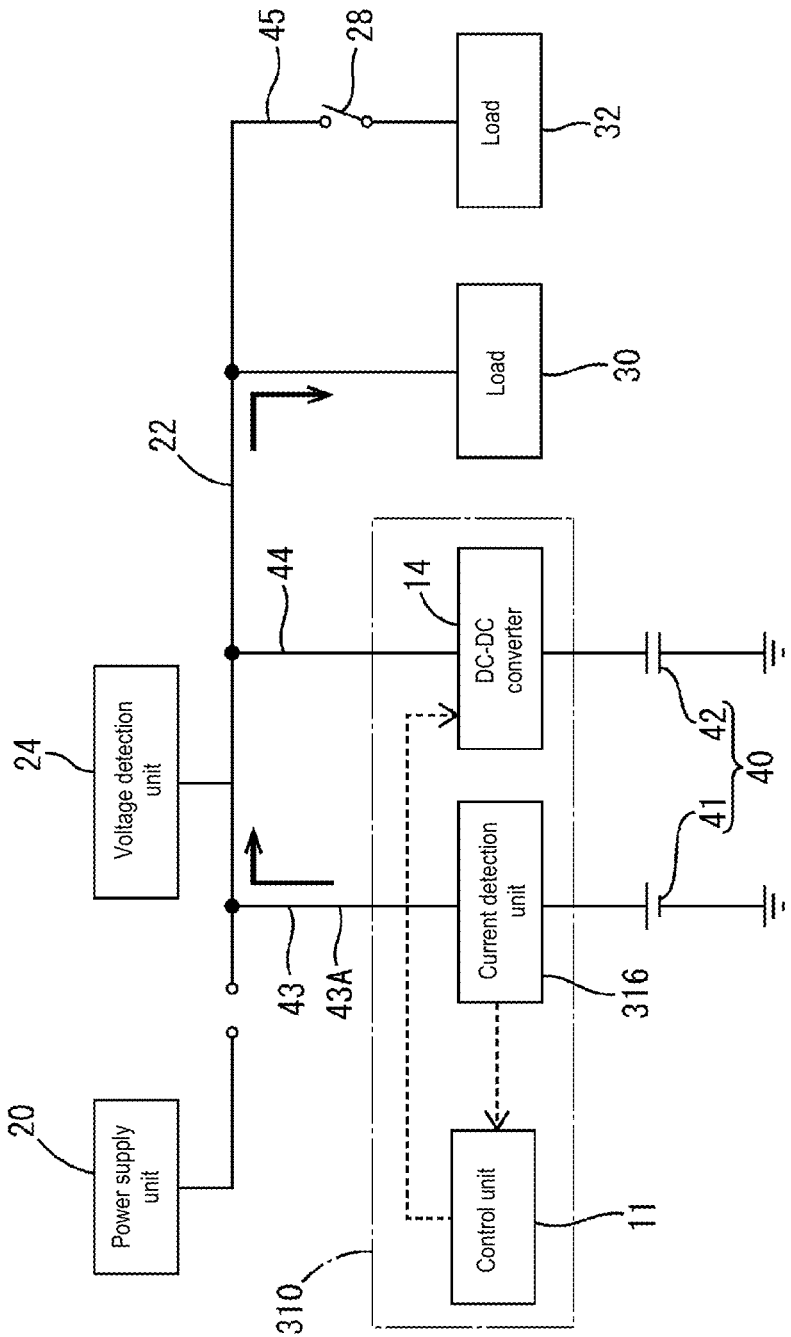
FIG. 11 is a diagram for describing an operation that supplies power from a battery to a load in the vehicle power supplying system in the third embodiment.
Figure 14:
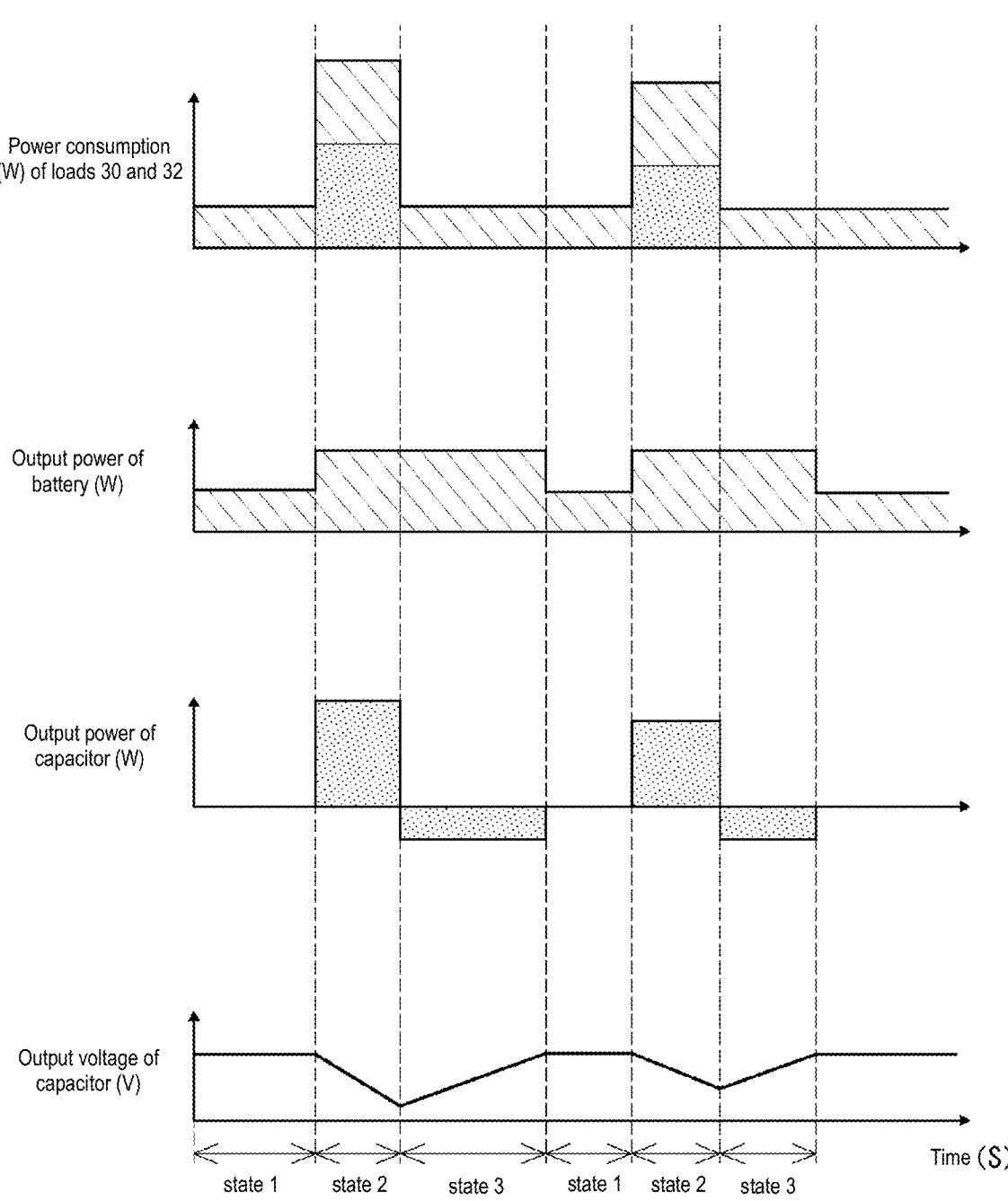
FIG. 14 is a timing chart of an operation performed by the vehicle power supplying system in the third embodiment.

In the same way as in the first embodiment, the control unit 11 performs the same processing as steps S11 and S12 after the conditions for starting the backup control have been met. When it has been determined in step S12 that the supplying of power from the power supply unit 20 is in the failure state, next in step S31, as depicted in FIG. 11, the control unit 11 performs a backup operation to supply power based on the battery 41 to the load 30. As one example, in the same way as in the first embodiment, when the supplying of power from the power supply unit 20 is in the failure state, the control unit 11 cuts off the part of the power path 22 that is closer to the power supply unit 20 than the connection point P. By doing so, the output voltage of the battery 41 is applied to the conductive path 43A (the power path 22). "State 1" in FIG. 14 is a state where the control unit 11 is performing the processing in step S31.

Next, the control unit 11 determines whether the current value of the current flowing from the battery 41 to the power path 22 (that is, the detection value of the current detection unit 316) is equal to or less than the threshold current (step S32). As one example, the threshold current is a fixed value that is greater than the current value required for the load 32 to operate. However, the threshold current may be changeable. When the current value of the current flowing from the battery 41 to the power path 22 is equal to or less than the threshold current, it is estimated that the load 32 is not in an operating state (that is, the switch 28 is in the off state). On the other hand, if the current value of the current flowing from the battery 41 to the power path 22 is not equal to or less than the threshold current (that is, the current exceeds the threshold current), it is estimated that the load 32 is in the operating state (that is, the switch 28 is in the on state). When it has been determined that the current value of the current flowing from the battery 41 to the power path 22 is equal to or less than the threshold current ("Yes" in step S32), the control unit 11 performs the processing in step S14 in the same way as in the first embodiment.

Figure 12:
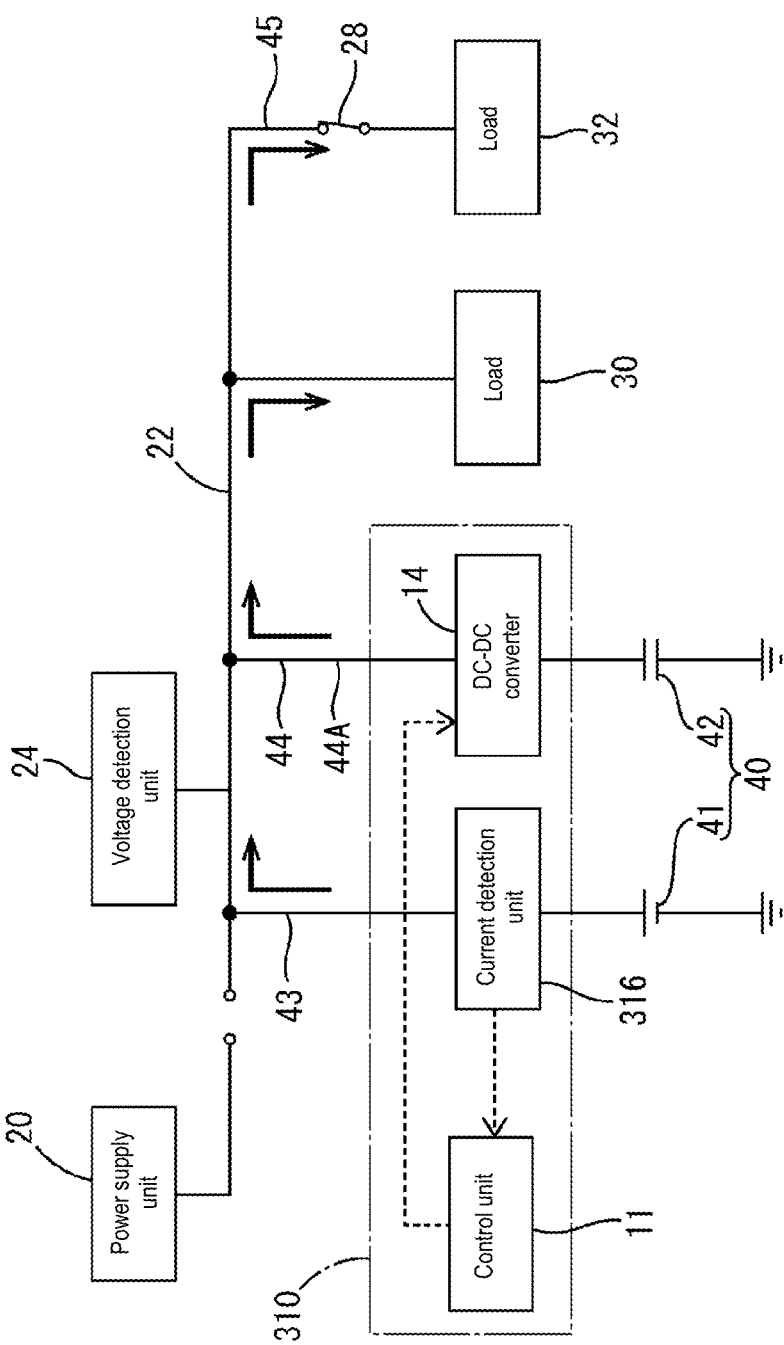
FIG. 12 is a diagram for describing an operation that supplies power from a battery and a capacitor to a load in the vehicle power supplying system in the third embodiment.

On the other hand, if it has been determined that the current value of the current flowing from the battery 41 to the power path 22 is not equal to or below the threshold current (that is, the current exceeds the threshold current) ("No" in step S32), as depicted in FIG. 12, the control unit 11 causes the charging/discharging unit 12 to perform a backup operation that supplies both power from the battery 41 and power from the capacitor 42 to the loads 30 and 32 (step S33). In more detail, the control unit 11 supplies power based on the battery 41 to the loads 30 and 32, while applying a voltage obtained by the DC-DC converter 14 stepping up or stepping down the output voltage of the capacitor 42 to the conductive path 44A (the power path 22). "State 2" in FIG. 14 is a state where the control unit 11 is performing the processing in step S33.

Next, the control unit 11 determines whether a specified load is in a stopped state (step S34). Here, the "specified load" is a load that is set in advance in the control unit 11, and as one example is the load 32. The control unit 11 determines whether the current value of the current flowing from the battery 41 to the power path 22 (that is, the detection value of the current detection unit 316) is equal to or less than the threshold current. As one example, if the current value of the current flowing from the battery 41 to the power path 22 is equal to or less than the threshold current, it is determined that the load 32 is not in the operating state (that is, the switch 28 is in the off state). On the other hand, if the current value of the current flowing from the battery 41 to the power path 22 is not equal to or less than the threshold current (that is, the current exceeds the threshold current), it is determined that the load 32 is in the operating state (that is, the switch 28 is in the on state).

Figure 13:
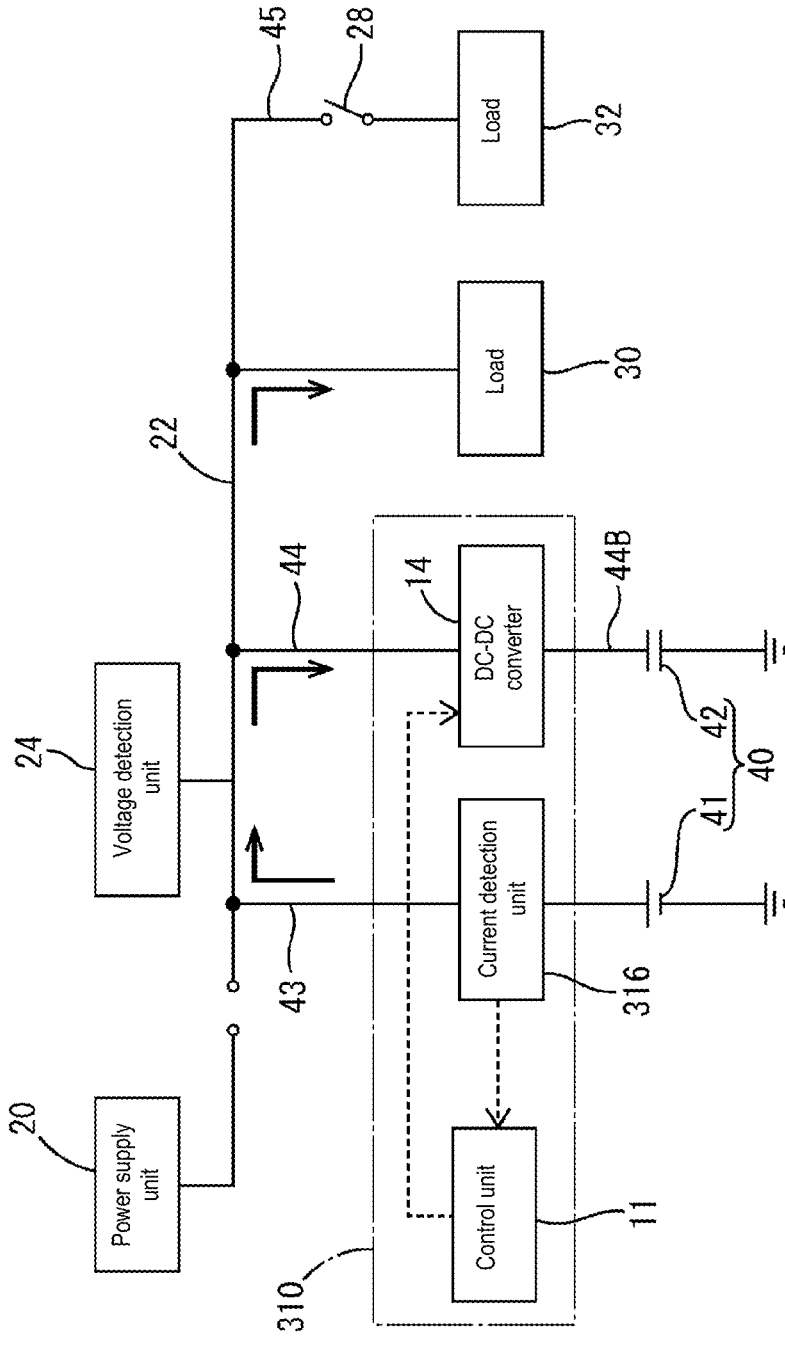
FIG. 13 is a diagram for describing an operation that supplies power from a battery to a capacitor and a load in the vehicle power supplying system in the third embodiment.

If it has been determined that the specified load (the load 32) is not in a stopped state (that is, the load is in the operating state) ("No" in step S34), the control unit 11 performs the processing in step S32 again. On the other hand, if it has been determined that the specified load (the load 32) is in the stopped state ("Yes" in step S34), as depicted in FIG. 13, the control unit 11 performs power supply from the battery 41 to the capacitor 42 (step S35). In more detail, the control unit 11 turns off the switch 28 and operates the DC-DC converter 14 to charge the capacitor 42 based on power from the battery 41. The control unit 11 causes the DC-DC converter 14 to apply a voltage obtained by stepping up or stepping down the output voltage of the battery 41 to the conductive path 44B. In this way, during a period where the supplying of power from the capacitor 42 to a specified load (the load 32) that is set in advance has stopped, the control unit 11 operates the DC-DC converter 14 to charge the capacitor 42 based on power from the battery 41. "State 3" in FIG. 14 is a state where the control unit 11 is performing the processing in step S35. After step S35, the control unit 11 performs the processing in step S14.

In step S14, the control unit 11 performs the same processing as in step S14 in the first embodiment. When it has been determined that the vehicle is not in a stopped state (that is, the vehicle is in the started state) ("No" in step S14), the control unit 11 performs the processing in step S31 again. On the other hand, when it has been determined in step S14 that the vehicle is in the stopped state (that is, the vehicle is not in the started state) ("Yes" in step S14), the control unit 11 ends the backup control in FIG. 10.

Effects of Third Embodiment

With the vehicle power supplying system 300 according to the third embodiment, if, in the failure state, the current value of the current supplied from the battery 41 is equal to or less than the threshold current and it is estimated that excessive current is not being supplied from the battery 41 to the load 30, it is possible to allow the battery 41 to supply power to the load 30. As one example, when the load 32 is in the stopped state, an excessive current is not supplied from the battery 41 to the load 30. On the other hand, when the current value of the current supplied from the battery 41 exceeds the threshold current and it is estimated that an excessive current is being supplied from the battery 41 to the load 30, it is possible to start supplying power from the capacitor 42 to the load 30. By doing so, it is possible to prevent overdischarge of the battery 41. As one example, when the load 32 is in the operating state, an excessive current will be supplied from the battery 41 to the load 30.

The control unit 11 operates the charging/discharging unit 12 to charge the capacitor 42 based on the power from the battery 41. This makes it easier to maintain the charge level of the capacitor 42.

In the vehicle power supplying system 300 according to the third embodiment, since the charge level of the capacitor 42 will fall when power is supplied from the capacitor 42 to the load 30, by charging the capacitor 42 based on power from the battery 41, it becomes easier to maintain the charge level of the capacitor 42.

Fourth Embodiment

Figure 15:
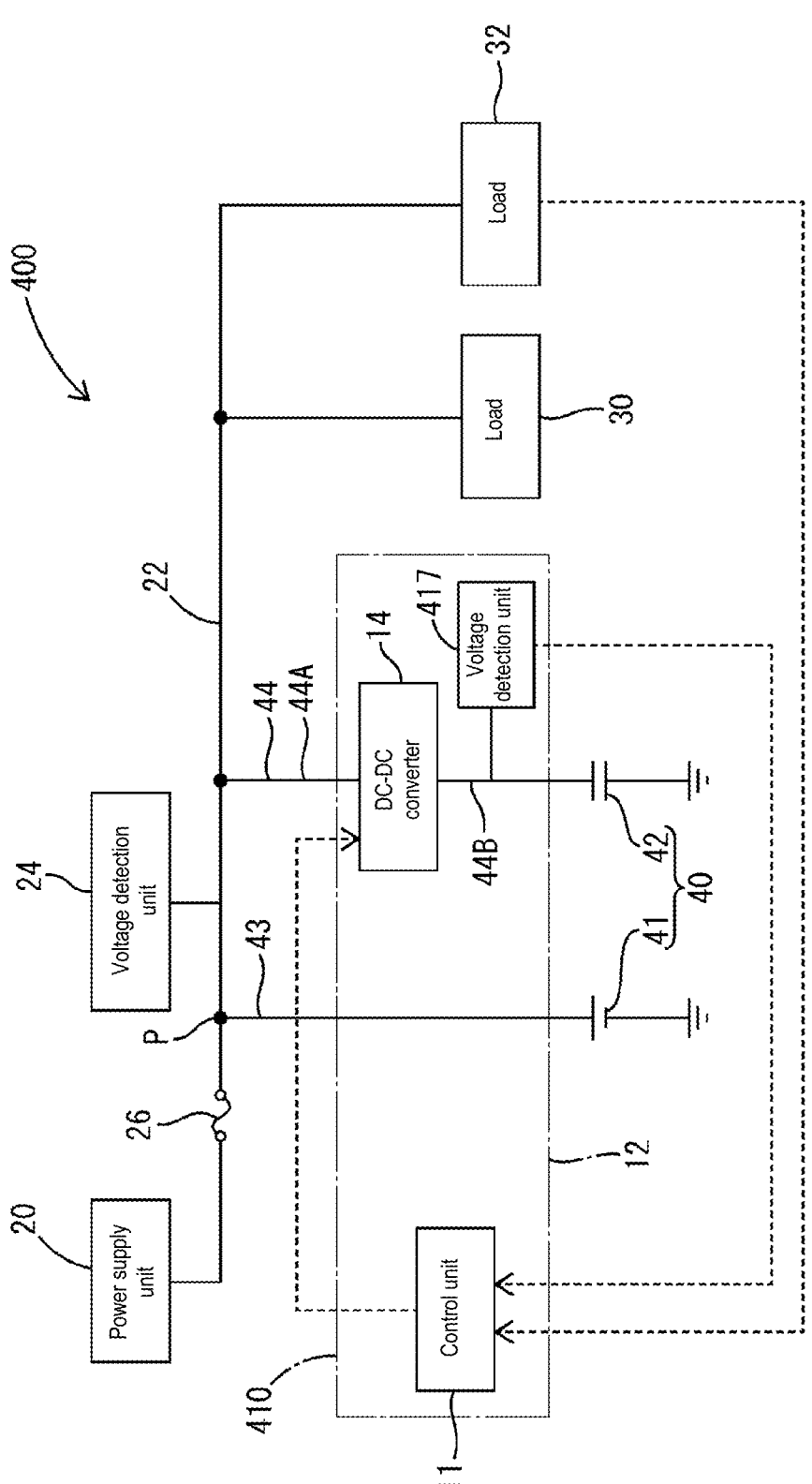
FIG. 15 is a block diagram schematically depicting a vehicle power supplying system in a fourth embodiment.

The vehicle power supplying system 400 according to the fourth embodiment differs from the third embodiment in that during a backup operation, the power source that is to supply power to a load is switched based on the operating state of a specified load, but is otherwise the same as the fourth embodiment. Note that components that are the same as in the third embodiment have been assigned the same reference numerals and detailed description thereof is omitted.
Configuration of Vehicle Power Supplying System As depicted in FIG. 15, like the third embodiment, the vehicle power supplying system 400 includes a load 32 in addition to the load 30. The load 32 is configured to transmit an operation start signal to the control unit 11 when the load 32 starts operating, and to transmit an operation stop signal to the control unit 11 when the load 32 stops operating.

As depicted in FIG. 15, the vehicle power supplying system 400 includes a vehicle backup apparatus 410. The vehicle backup apparatus 410 includes the control unit 11, the DC-DC converter 14, and a voltage detection unit 417. The DC-DC converter 14 corresponds to one example of a "charging/discharging unit" according to the present disclosure. Unlike the third embodiment, the vehicle backup apparatus 410 does not include the current detection unit 316. The voltage detection unit 417 is provided on the conductive path 44B. The voltage detection unit 417 detects a voltage value of the output voltage of the capacitor 42 on the conductive path 44B. The voltage detection unit 417 is configured as a voltage detection circuit and detects the voltage applied to the conductive path 44B.

Figure 16:
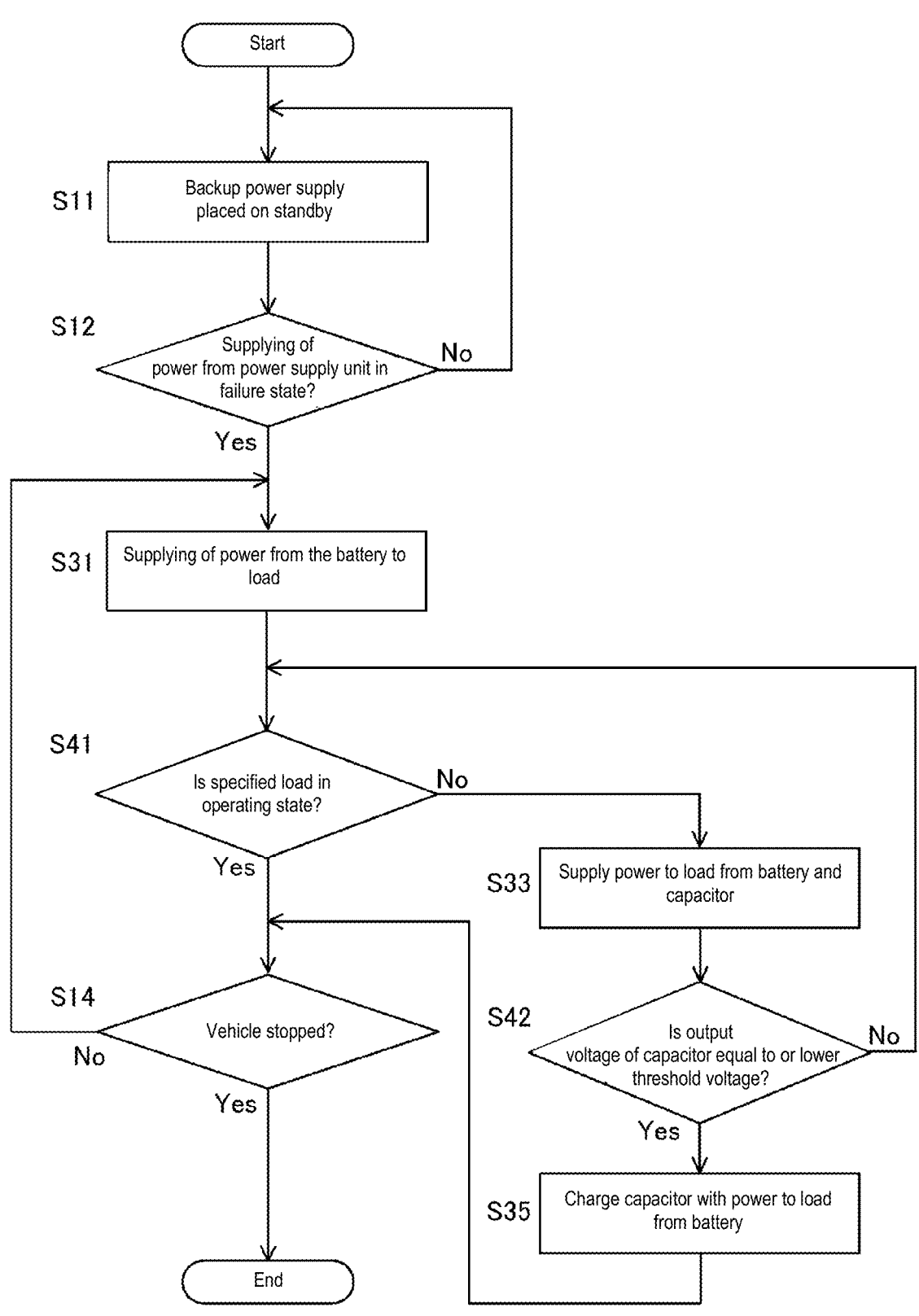
FIG. 16 is a flowchart depicting a flow of control performed by a vehicle backup apparatus according to the fourth embodiment.

When the supplying of power from the power supply unit 20 is in the failure state and a specified load set in advance is in the operating state, the control unit 11 causes the DC-DC converter 14 to perform a backup operation that supplies power from the capacitor 42 to the specified load.
Operation of the Vehicle Backup Apparatus FIG. 16 depicts one example of backup control performed by the vehicle backup apparatus 410 (specifically, the control unit 11). The backup control performed by the vehicle backup apparatus 410 (specifically, the control unit 11) in the fourth embodiment differs from that in the third embodiment in steps S41 and S42.

Figure 17:
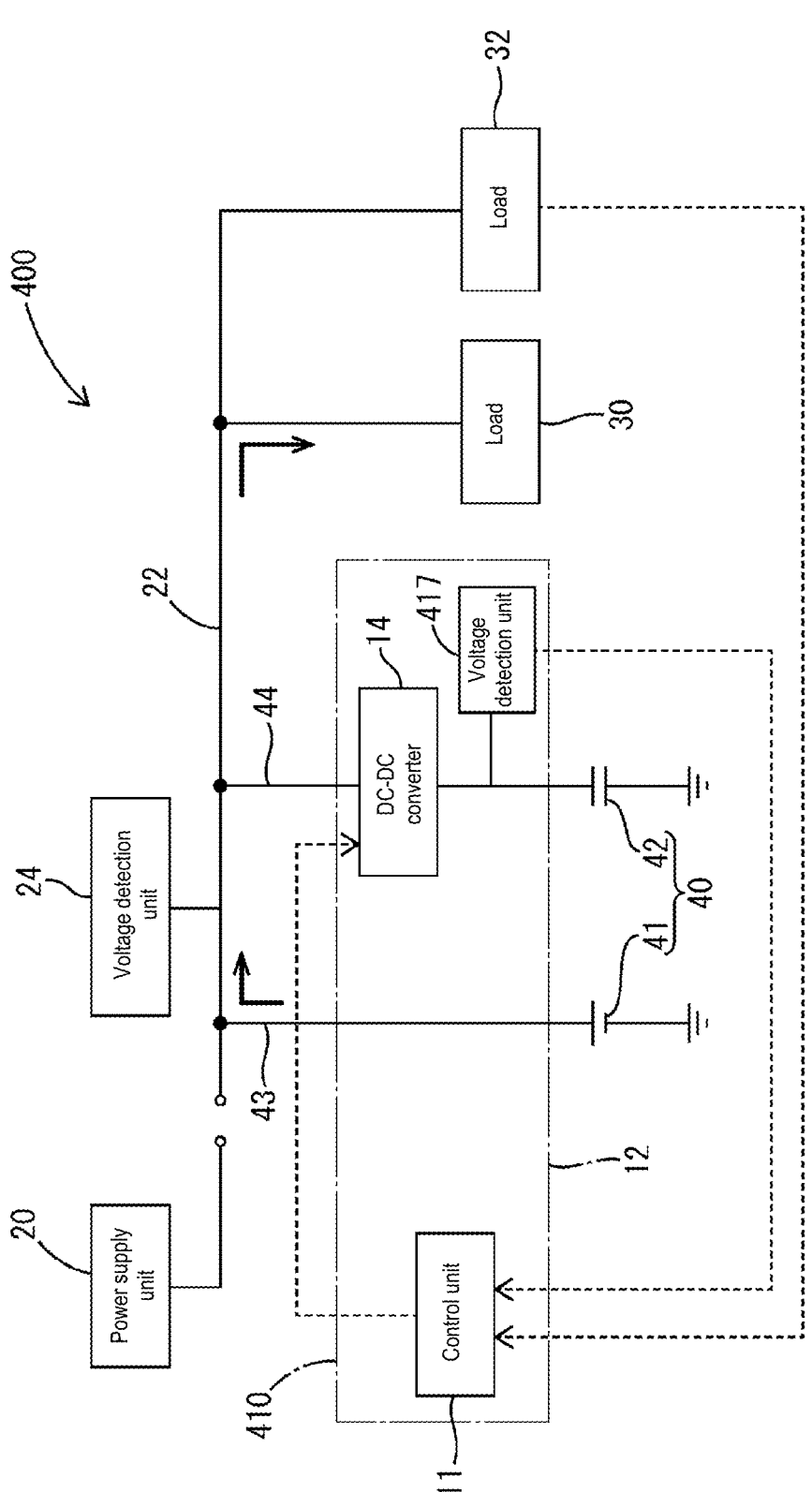
FIG. 17 is a diagram for describing an operation that supplies power from a battery to a load in the vehicle power supplying system in the fourth embodiment.

In the same way as in the third embodiment, after the conditions for starting the backup control have been met, the control unit 11 performs the same processing as steps S11, S12, and S31. In step S31, as depicted in FIG. 17, the control unit 11 performs a backup operation to supply power based on the battery 41 to the load 30.

Next, the control unit 11 determines whether the specified load is in the operating state (step S41). The specified load is a load that is set in advance in the control unit 11, and as one example is the load 32. Here, the expression "the load 32 is in the operating state" refers to a state where an operation stop signal is yet to be received after an operation start signal has been received from the load 32. When it has been determined that the specified load is in the operating state ("Yes" in step S41), the control unit 11 performs the processing in step S14 in the same way as in the third embodiment.

Figure 18:
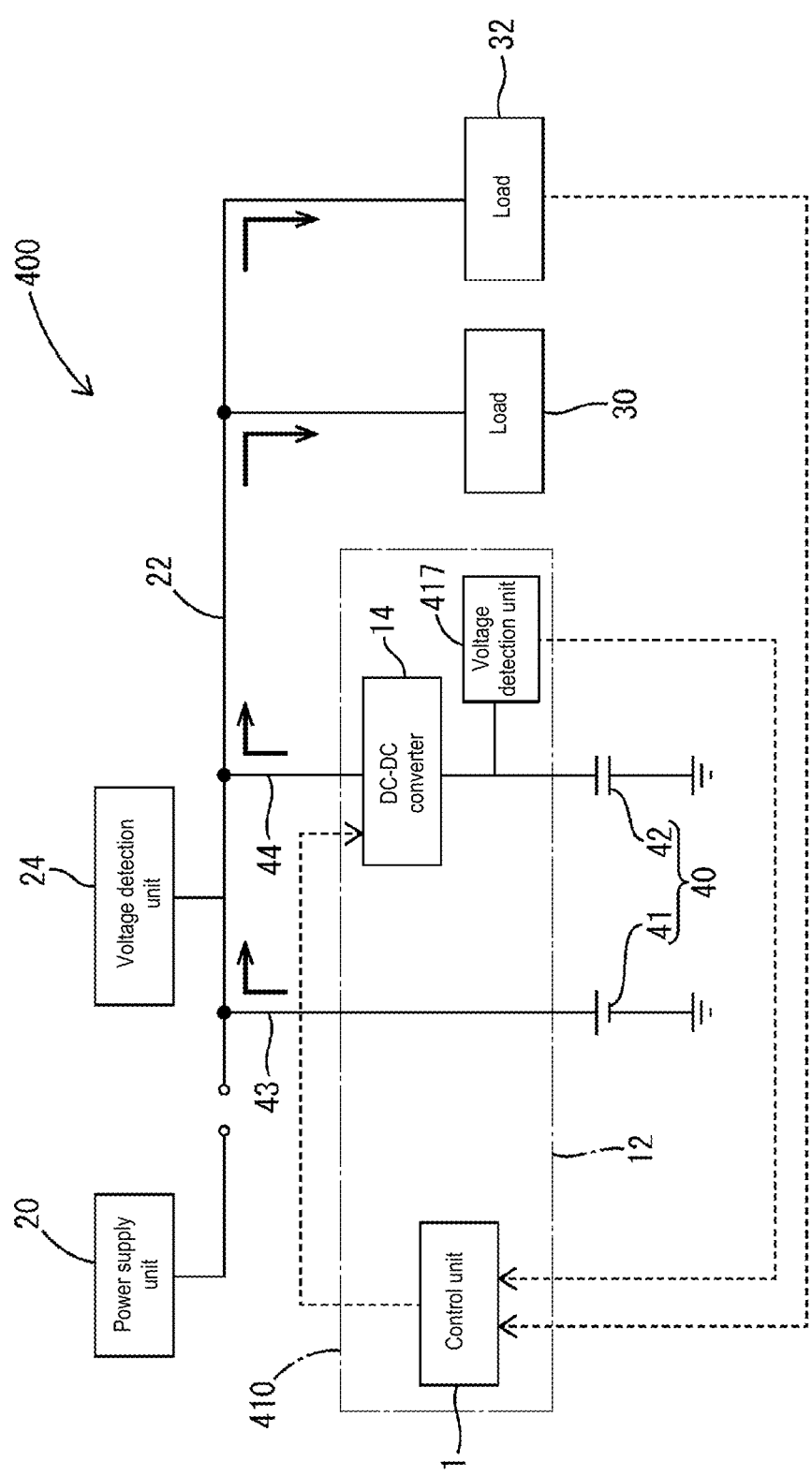
FIG. 18 is a diagram for describing an operation that supplies power from a battery and a capacitor to respective loads in the vehicle power supplying system in the fourth embodiment.

On the other hand, if it has been determined that the specified load is not in the operating state (that is, the load has stopped) ("No" in step S41), as depicted in FIG. 18 and in the same way as in the third embodiment, the control unit 11 causes the charging/discharging unit 12 to perform a backup operation that supplies both power from the battery 41 and power from the capacitor 42 to the loads 30 and 32 (step S33).

After this, the control unit 11 determines whether the output voltage of the capacitor 42 is equal to or lower than a second threshold voltage (step S42). The second threshold voltage corresponds to one example of a "threshold voltage" for the present disclosure. As one example, the second threshold voltage is a fixed value that is lower than the output voltage of the capacitor 42 when the capacitor 42 is fully charged. However, the second threshold voltage may be changeable. The control unit 11 determines whether the voltage value detected by the voltage detection unit 417 is equal to or lower than the second threshold voltage.

Figure 19:
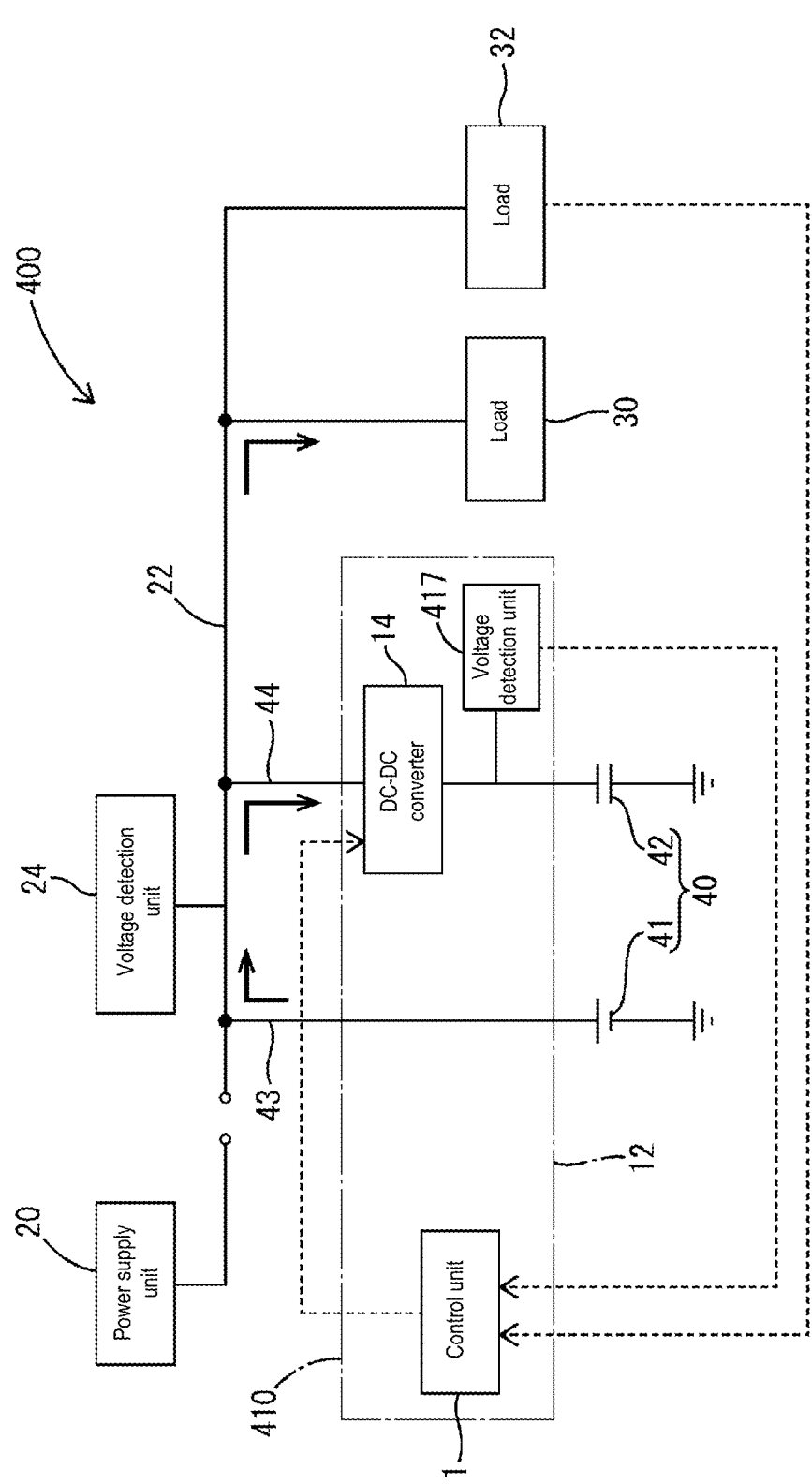
FIG. 19 is a diagram for describing an operation that supplies power from a battery to a capacitor and a load in the vehicle power supplying system in the fourth embodiment.

When it has been determined that the output voltage of the capacitor 42 is not equal to or lower than the second threshold voltage (that is, the output voltage exceeds the second threshold voltage) ("No" in step S42), the control unit 11 performs the processing in step S41 again. On the other hand, when it has been determined that the output voltage of the capacitor 42 is equal to or lower than the second threshold voltage ("Yes" in step S42), in the same way as in step S35 in the third embodiment and as depicted in FIG. 19, the control unit 11 charges the capacitor 42 with power from the battery 41 (step S35). After step S35, the control unit 11 performs the processing in step S14.

In step S14, the control unit 11 performs the same processing as in step S14 in the first embodiment. When it has been determined that the vehicle is not in the stopped state (that is, the vehicle is in the started state) ("No" in step S14), the control unit 11 performs the processing in step S31 again. On the other hand, when it has been determined in step S14 that the vehicle is in the stopped state (that is, not the started state) ("Yes" in step S14), the control unit 11 ends the backup control in FIG. 16.

Effects of Fourth Embodiment

In the vehicle power supplying system 400 according to the fourth embodiment, it is possible to start supplying power from the capacitor 42 based on a specified load (the load 32) having entered the operating state. This means it becomes easier to supply sufficient power from power sources including the capacitor 42 to the specified load (the load 32) without performing special control.

In the vehicle power supplying system 400 according to the fourth embodiment, when the voltage detected by the voltage detection unit 417 becomes equal to or lower than the second threshold voltage and it is estimated that the charge level of the capacitor 42 has fallen, the capacitor 42 can be charged based on power from the battery 41. This means that the fall in the charge level of the capacitor 42 can be efficiently suppressed.

Fifth Embodiment

The vehicle power supplying system 500 according to the fifth embodiment differs from the first embodiment in being configured to prevent overcharging and overdischarging of the battery 41, but is otherwise the same. Note that components that are the same as in the first embodiment have been assigned the same reference numerals and detailed description thereof is omitted.

Configuration of Vehicle Power Supplying System

Figure 20:
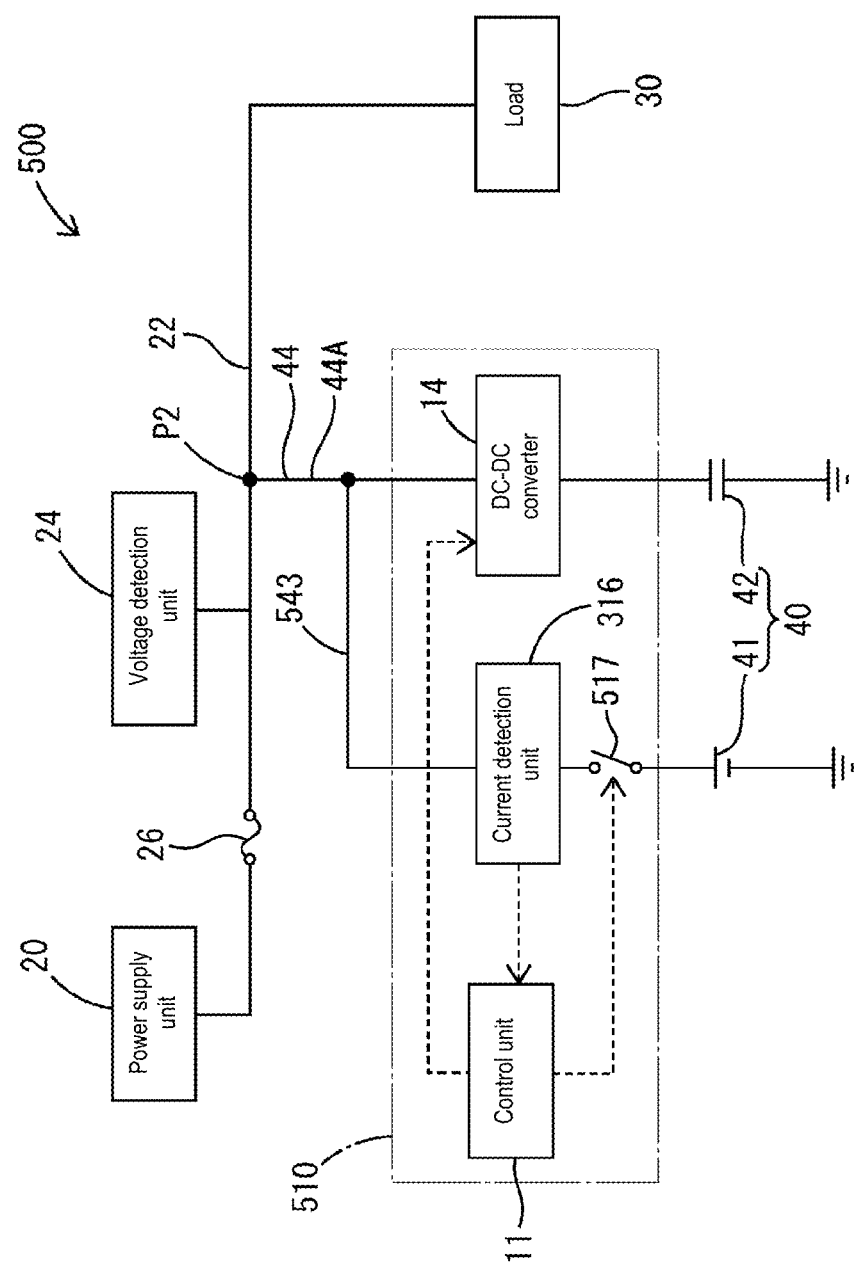
FIG. 20 is a block diagram schematically depicting a vehicle power supplying system in a fifth embodiment.

As depicted in FIG. 20, the vehicle power supplying system 500 includes a vehicle backup apparatus 510. The vehicle backup apparatus 510 includes the control unit 11, the charging/discharging unit 12, and the current detection unit 316. The charging/discharging unit 12 includes the DC-DC converter 14 and a switch 517. The current detection unit 316 is provided on a conductive path 543. The current detection unit 316 detects a current value of the output current of the battery 41 flowing on the conductive path 543. The current detection unit 316 is configured as a current detection circuit using, as examples, a current transformer and/or a shunt resistor. The conductive path 543 is electrically connected to the conductive path 44A.

A switch 517 is provided on the conductive path 543 between the current detection unit 316 and the battery 41. The switch 517 is composed of a MOSFET, for example. The switch 517 switches the conductive state of the conductive path 543 between an on state and an off state under the control of the control unit 11 or the like.

Operation of the Vehicle Backup Apparatus

Figure 21:
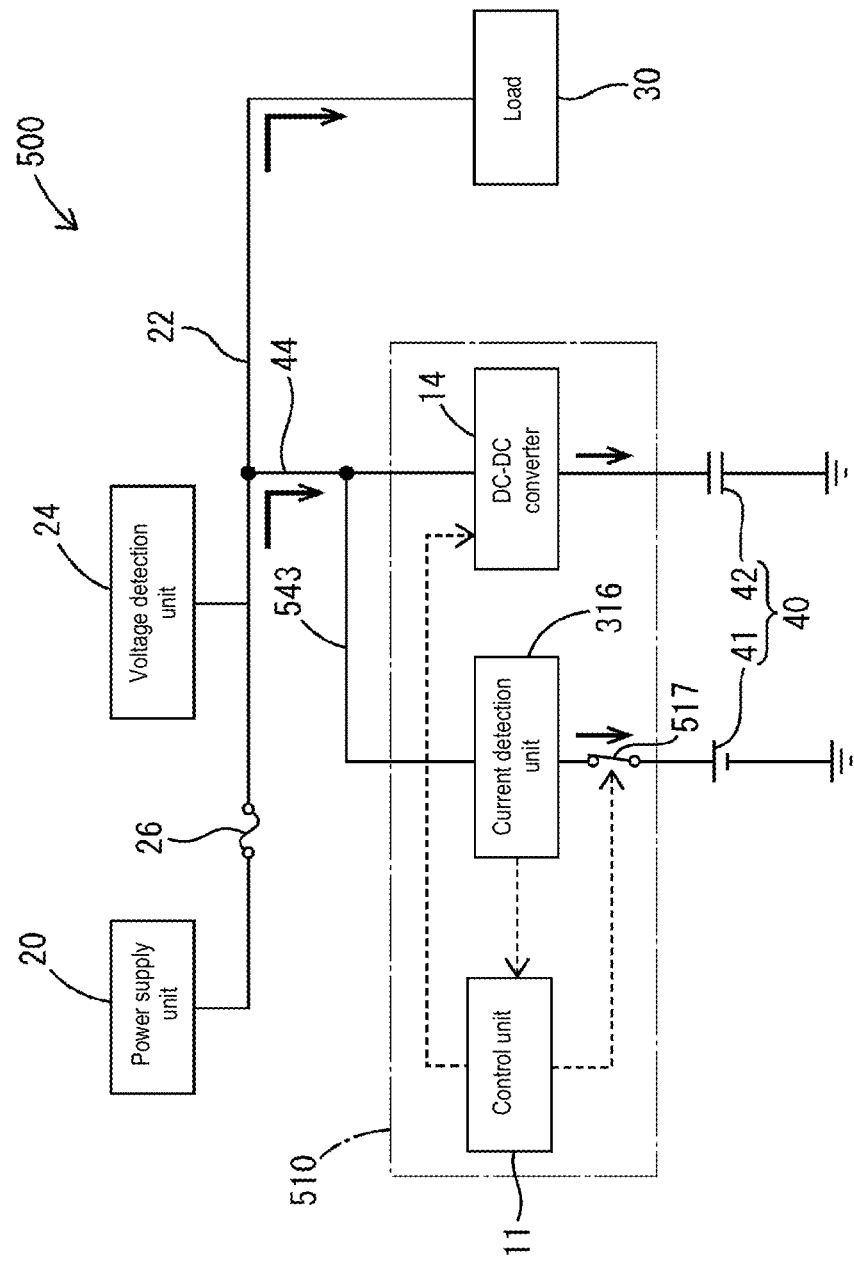
FIG. 21 is a diagram for describing an operation of supplying power from a power supply unit to a battery, a capacitor, and a load in the vehicle power supplying system in the fifth embodiment.

In the same way as in the first embodiment, when backup control has started, the control unit 11 places the backup power supply 40 in a standby state. As one example, as depicted in FIG. 21, the power of the power supply unit 20 is supplied to the load 30, and the power of the power supply unit 20 is also supplied to the battery 41 and the capacitor 42. At this time, the control unit 11 places the switch 517 in the on state. The control unit 11 charges the battery 41 and the capacitor 42 so that their charge voltages are equal to or higher than a target voltage that is higher than a standby voltage. When charging the battery 41, if the value of the current detected by the current detection unit 316 exceeds a first predetermined value, the control unit 11 switches the switch 517 from the on state to the off state. The first predetermined value corresponds to one example of a "predetermined value" for the present disclosure. The first predetermined value is a value that is set in advance by the control unit 11. By doing so, when the value of the current detected by the current detection unit 316 exceeds the first predetermined value and it is estimated that the battery 41 is being overcharged, it is possible to cut off the conductive path 543 to stop the charging of the battery 41.

Figure 22:
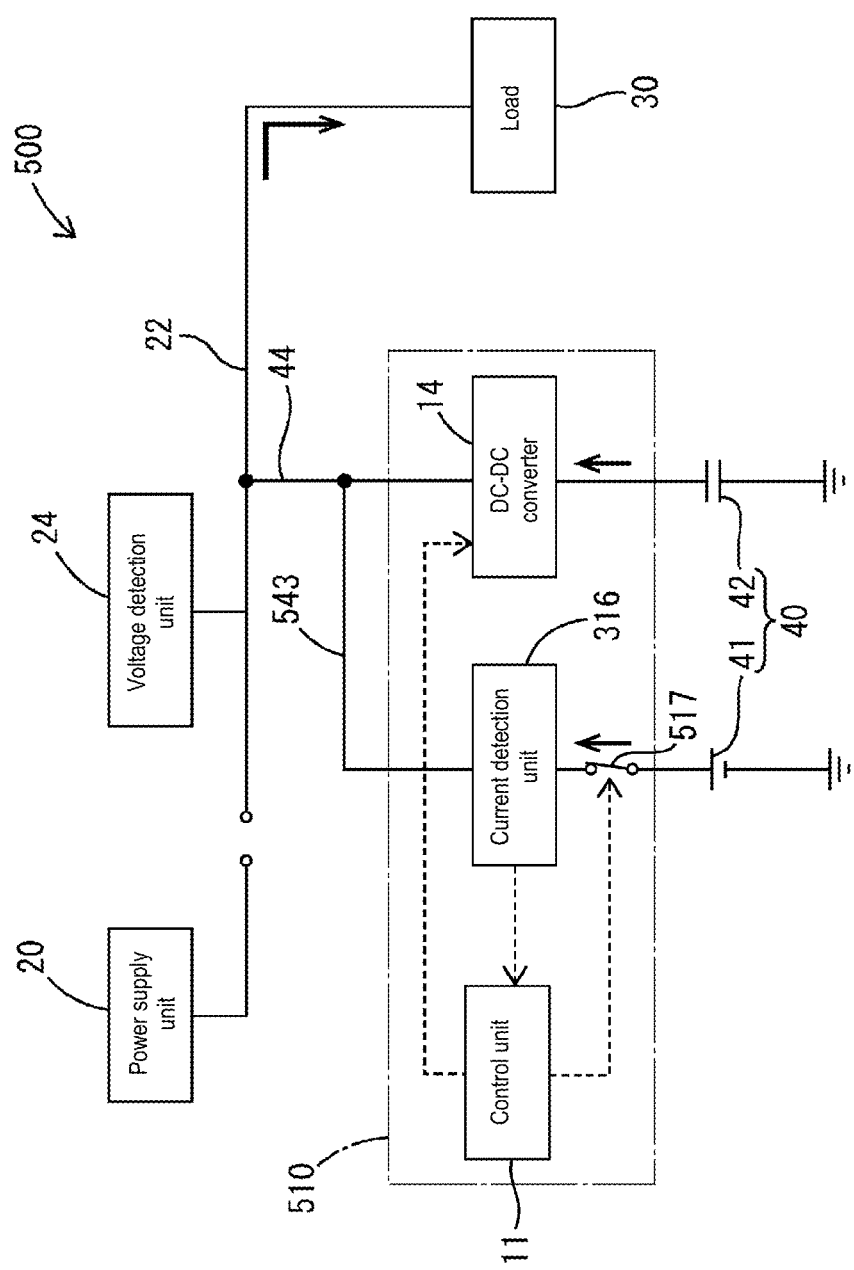
FIG. 22 is a diagram for describing an operation of supplying power from a battery and a capacitor to a load in the vehicle power supplying system in the fifth embodiment.

In the same way as in the first embodiment, if it has been determined, after the backup power supply 40 has been placed into the standby state, that the supplying of power from the power supply unit 20 is in the failure state, the control unit 11 cuts off the part of the power path 22 that is closer to the power supply unit 20 than a connection point P2. As one example, the fuse 26 is placed in a cut off state, or a switch, such as a relay, which is provided separately is switched off. After this, a backup operation is performed as depicted in FIG. 22 so that power based on the backup power supply 40 is supplied to the load 30. At this time, the control unit 11 places the switch 517 in the on state. If, during discharging of the battery 41, the value of the current detected by the current detection unit 316 exceeds a second predetermined value, the control unit 11 switches the switch 517 from the on state to the off state. The second predetermined value corresponds to one example of a "predetermined value" for the present disclosure. The second predetermined value is a value that is set in advance by the control unit 11. By doing so, when the value of the current detected by the current detection unit 316 exceeds the second predetermined value and it is estimated that the battery 41 is being overdischarged, the conductive path 543 can be cut off to stop the discharging of the battery 41.

Effects of Fifth Embodiment

In the vehicle power supplying system 500 according to the fifth embodiment, when the value of the current detected by the current detection unit 316 exceeds the first predetermined value and it is estimated that the battery 41 is being overcharged, it is possible to cut off the conductive path 543 to stop the charging of the battery 41. When the value of the current detected by the current detection unit 316 exceeds the second predetermined value and it is estimated that the battery 41 is being overdischarged, it is possible to cut off the conductive path 543 to stop the discharging of the battery 41.

In the vehicle power supplying system 500 according to the fifth embodiment, the charging voltage or discharging voltage of the capacitor 42 can be controlled to a desired level through operation of the DC-DC converter 14. Charging or discharging of the capacitor 42 can be stopped by operating the DC-DC converter 14 to cut off the connection between the capacitor 42 and the power path 22. On the other hand, since the battery 41 is connected to the power path 22 via the conductive path 543, the configuration can be simplified compared to a configuration in which a DC-DC converter is provided between the battery 41 and the power path 22.

Sixth Embodiment

The vehicle power supplying system 600 according to the sixth embodiment differs from the fifth embodiment in that it is configured to be capable of supplying power from a plurality of capacitors 42 to a load 30, but is otherwise the same. Note that components that are the same as in the fifth embodiment have been assigned the same reference numerals and detailed description thereof is omitted.

Configuration of Vehicle Power Supplying System

Figure 23:
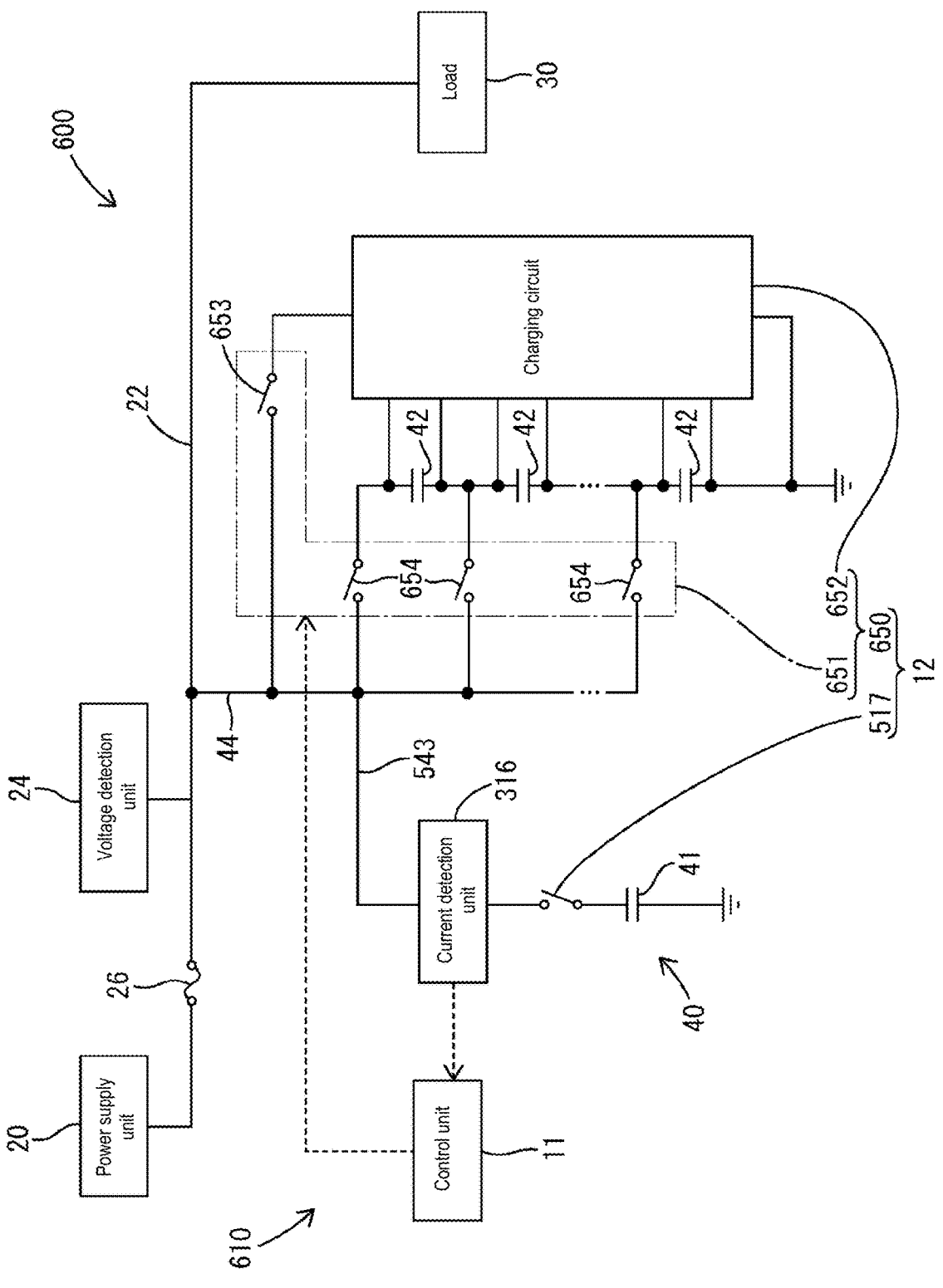
FIG. 23 is a block diagram schematically depicting a vehicle power supplying system in a sixth embodiment.

As depicted in FIG. 23, the vehicle power supplying system 600 includes a plurality of capacitors 42 and a vehicle backup apparatus 610. The backup power supply 40 includes the battery 41 and the plurality of capacitors 42. The plurality of capacitors 42 are connected in series. One electrode of a capacitor 42 on the high-potential side (that is, the power supply unit 20 side) of the plurality of capacitors 42 is electrically connected to the conductive path 44 via a switch 654, which will be described later. One electrode of a capacitor 42 at the low-potential side (the opposite side to the power supply unit 20 side) of the plurality of capacitors 42 is electrically connected to ground.

Figure 24:
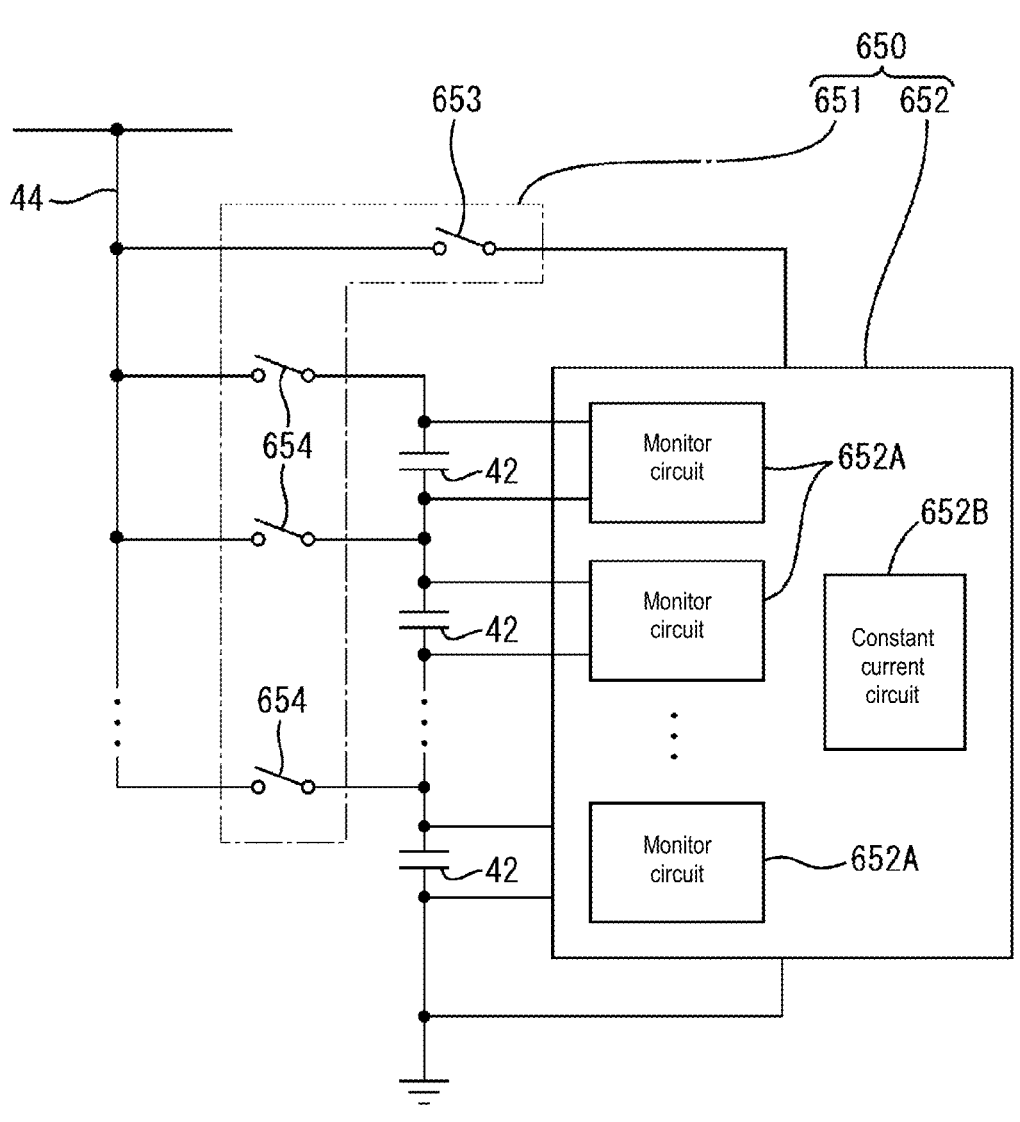
FIG. 24 is a block diagram schematically depicting a capacitor-side charging/discharging unit appearing in FIG. 23.

The vehicle backup apparatus 610 includes the control unit 11, the current detection unit 316, and the charging/discharging unit 12. The charging/discharging unit 12 includes the switch 517 and a capacitor-side charging/discharging unit 650. The current detection unit 316, the configuration of the switch 517, and the configuration of the conductive path 543 are the same as in the fifth embodiment. The capacitor-side charging/discharging unit 650 is controlled by the control unit 11. The capacitor-side charging/discharging unit 650 charges the respective capacitors 42 based on power from at least one of the power supply unit 20 and the battery 41 so that the charge voltages of the capacitors 42 become equal. As depicted in FIG. 24, the capacitor-side charging/discharging unit 650 includes a selection unit 651 and a charging circuit 652.

The charging circuit 652 includes a plurality of monitor circuits 652A and a constant current circuit 652B. The plurality of monitor circuits 652A one-to-one correspond to the plurality of capacitors 42. The monitor circuits 652A are connected in parallel to the respective capacitors 42. Each monitor circuit 652A is a circuit that detects the charge voltage of the corresponding capacitor 42. The constant current circuit 652B is a circuit that supplies a constant current for charging the respective capacitors 42. The charging circuit 652 supplies a constant current generated by the constant current circuit 652B to the respective capacitors 42 based on the detection results (charge voltage values) of the respective monitor circuits 652A so as to charge the capacitors 42 so that their charge voltages become equal.

The selection unit 651 functions to select capacitor(s) 42 to supply power to the load 30 out of the plurality of capacitors 42. As depicted in FIG. 24, the selection unit 651 includes a switch 653 and a plurality of switches 654. The switches 653 and 654 are composed of MOSFETs, for example. The switch 653 is provided on a conductive path between the conductive path 44 and the high-potential side terminal of the charging circuit 652. The switch 653 is switched from an off state to an on state under the control of the control unit 11 when the capacitors 42 are to be charged. The low-potential side terminal of the charging circuit 652 is electrically connected to ground. The respective switches 654 are provided between the conductive path 44 and the high-potential side electrodes of the respective capacitors 42. A switch 654 is switched from the off state to the on state under the control of the control unit 11 when the corresponding capacitor 42 is to be discharged.

Operation of Vehicle Backup Apparatus

In the same way as in the first embodiment, when backup control has started, the control unit 11 places the backup power supply 40 in a standby state. As one example, the power of the power supply unit 20 is supplied to the load 30 and the power of the power supply unit 20 is also supplied to the battery 41 and the charging circuit 652. The control unit 11 charges the battery 41 and the plurality of capacitors 42 so that their charge voltages are equal to or higher than a target voltage that is higher than the standby voltage. At this time, the control unit 11 switches the switch 517 and the switch 653 to the on state, and switches the switch 654 to the off state. Through the same control as in the fifth embodiment, when the value of the current detected by the current detection unit 316 exceeds the first predetermined value and it is estimated that the battery 41 is being overcharged, the control unit 11 cuts off the conductive path 543 to stop the charging of the battery 41.

Based on the detection results (charge voltage values) of each monitor circuit 652A, the charging circuit 652 supplies each capacitor 42 with a constant current generated by the constant current circuit 652B using power from the power supply unit 20 and thereby charges the respective capacitors 42 so that their charge voltages become equal.

In the same way as in the fifth embodiment, when, after the backup power supply 40 has been placed in the standby state, it is determined that the supplying of power from the power supply unit 20 is in a failure state, the control unit 11 performs a backup operation that supplies power based on the backup power supply 40 to the load 30. At this time, the control unit 11 places the switch 517 in the on state. In the same way as in the fifth embodiment, if, during discharging of the battery 41, the value of the current detected by the current detection unit 316 exceeds a second predetermined value and it is estimated that the battery 41 is being overdischarged, the control unit 11 cuts off the conductive path 543 to stop the discharging of the battery 41.

Figure 25:
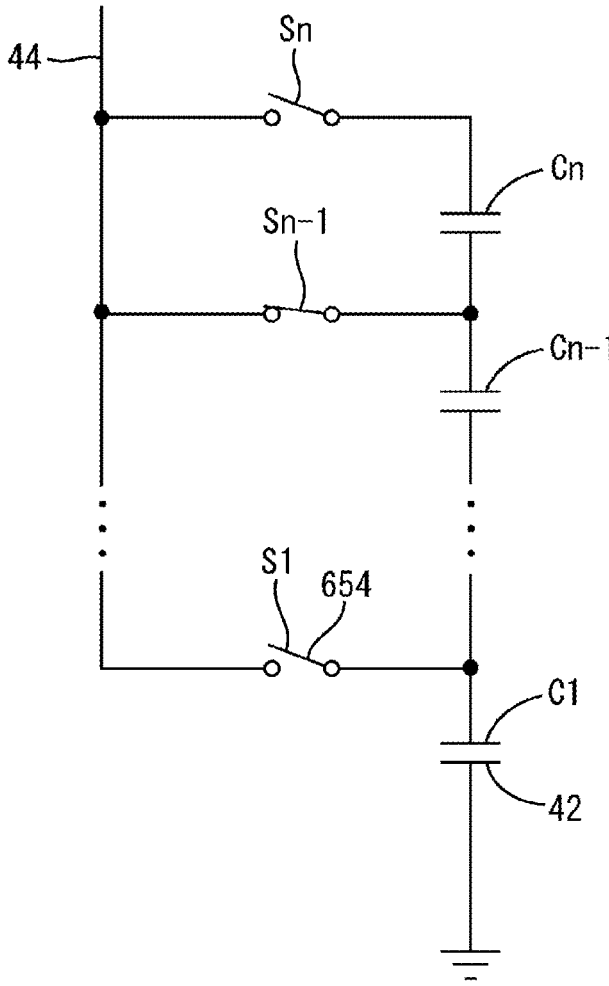
FIG. 25 is a diagram for describing a selection state in a first selection type selected by a selection unit appearing in FIG. 23.

The capacitor-side charging/discharging unit 650 performs a discharging operation as follows. First, as depicted in FIG. 25, the plurality of capacitors 42 that are aligned from the low-potential side (that is, the ground side) will be referred to as "capacitor C1", . . . , "capacitor Cn−1", "capacitor Cn". Here, n is a natural number. In order from the capacitor 42 on the low-potential side (the ground side), the capacitors 42 are each assigned a symbol "Cn" such that n increases by 1. In the same way, the switches 654 that are aligned from the low-potential side (the ground side) are referred to as "switch S1", . . . , "switch Sn−1", "switch Sn". Again, n is a natural number. In order from the switch 654 on the low-potential side (the ground side), the switches are each assigned a symbol "Sn" such that n increases by 1.

Figure 26:
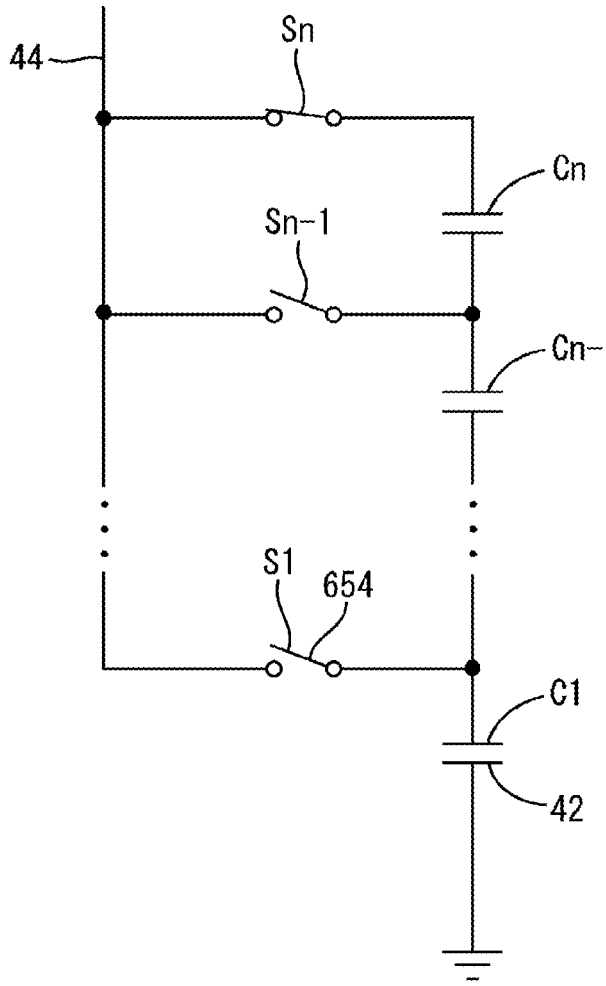
FIG. 26 is a diagram for describing a selection state in a second selection type selected by a selection unit appearing in FIG. 23.

The selection unit 651 makes a selection between a first selection type that selects a predetermined number of capacitors 42 and a second selection type that selects a plurality of capacitors 42 that are connected in series and are greater in number than in the first selection type. As one example, the first selection type is the selection pattern shown in FIG. 25 where the capacitor C1, the capacitor C2, . . . , and the capacitor Cn−1 are selected. In the first selection type, the capacitor C1, the capacitor C2, . . . , and the capacitor Cn−1 are connected in series. The first selection type is selected by placing the switch S1, . . . , and the switch Sn in the off state and placing the switch Sn−1 in the on state. As one example, the second selection type is the selection pattern depicted in FIG. 26, where the capacitor C1, the capacitor C2, . . . , and the capacitor Cn−1, and the capacitor Cn are selected. In the second selection type, the capacitor C1, the capacitor C2, . . . , and the capacitor Cn−1, and the capacitor Cn are connected in series. The second selection type is selected by placing the switch S1, . . . , and the switch Sn−1 in the off state and placing the switch Sn in the on state. The first selection type is a selection that extracts some of the plurality of capacitors 42 selected by the second selection type. When the capacitors 42 have been fully charged, the output voltage outputted from the capacitors 42 selected when the first selection type is selected will be smaller than the output voltage outputted from the capacitors 42 selected when the second selection type is selected.

Figure 27:
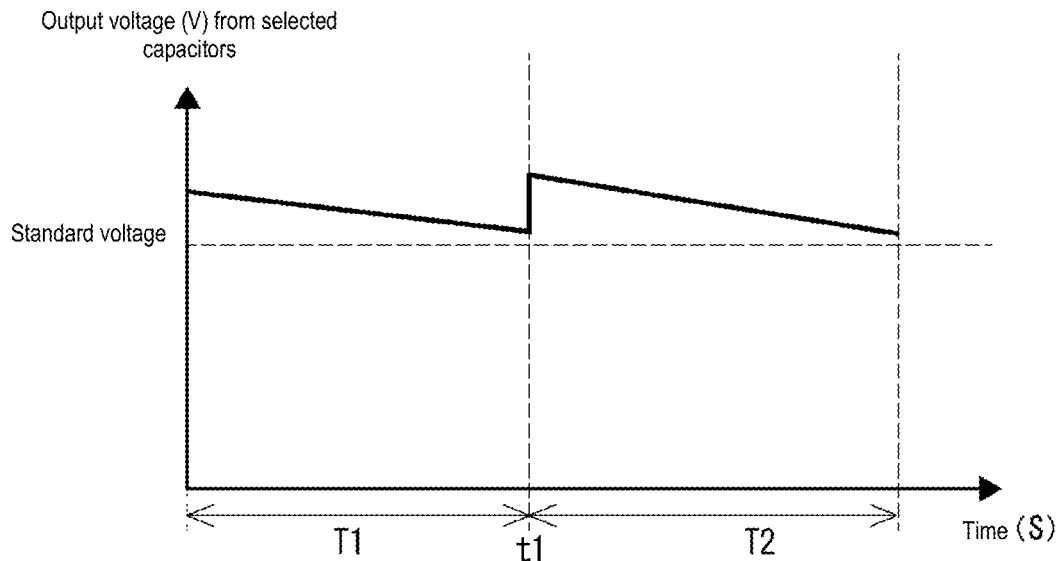
FIG. 27 is a diagram for describing changes over time in an output voltage of capacitors selected by the selection unit in the vehicle power supplying system in the sixth embodiment.

The control unit 11 performs a backup operation based on power from the capacitors 42 selected by the selection unit 651 in the first selection type, and then performs a backup operation based on power from the plurality of capacitors 42 selected by the selection unit 651 in the second selection type, which increases the output voltage outputted from the backup power source 40. As one example, as depicted in FIG. 27, the capacitors 42 are selected according to the first selection type in a period T1 and the capacitors 42 are selected according to the second selection type in a period T2. In this case, although the output voltage from the selected capacitors 42 will fall toward the end of period T1, capacitors 42 will be selected by the second selection type at time t1 before the output voltage falls below a reference voltage. This means that the output voltage from the selected capacitors 42 will increase at time t1, so that an output voltage that is larger than the reference voltage can be outputted for a longer period.

Note that aside from the examples described above, it is also possible to select capacitors 42 according to three or more selection types. As one example, a selection type for selecting the capacitor C1, a selection type for selecting the capacitors C1 and C2, a selection type for selecting the capacitors C1, C2, and C3, . . . , and a selection type for selecting the capacitors C1 to Cn may be selected in a sequence.

Note that when power is supplied from one or more capacitors 42 to the load 30, control may be performed to place the switch 517 in the off state so as to not supply power from the battery 41 to the load 30. By doing so, it is possible to prevent the potential of the power path 22 from depending on the output voltage of the battery 41 when power is supplied from the capacitor(s) 42.

Effect of Sixth Embodiment

In the vehicle power supplying system 600 according to the sixth embodiment, it is possible to select capacitors 42 that are to supply power to the load 30 out of the plurality of capacitors 42 so that a desired magnitude of power can be supplied to the load 30.

In the vehicle power supplying system 600 according to the sixth embodiment, even if the output voltage falls when power is supplied from the capacitors 42 selected in the first selection type, by supplying power from the plurality of capacitors 42 selected in the second selection type, it is possible to supply power while suppressing the fall in the output voltage of the selected capacitors 42.

OTHER EMBODIMENTS

Note that the embodiments disclosed above are exemplary in all respects and should not be regarded as limitations on the present disclosure. The scope of the present disclosure is indicated by the range of the patent claims, not the description given above, and is intended to include all changes within the meaning and scope of the patent claims and their equivalents.

The configuration in the fifth embodiment for suppressing overcharging and overdischarging of the battery 41 (that is, a configuration that switches the switch 517 from the on state to the off state when the value of the current detected by current detection unit 316 exceeds the first predetermined value during the charging or discharging of the battery 41) may also be used in the first to fourth embodiments.

The first and second embodiments may use a configuration where the DC-DC converter 13 is not provided on the high-potential side of the battery 41 on the conductive path 43.

The charging control in the third embodiment (that is, control for causing the charging/discharging unit 12 to charge the capacitor 42 based on power from the battery 41) may also be used in the backup control in the first, second, and fourth to sixth embodiments.

The charging control of the battery 41 in the fourth embodiment (that is, control for charging the capacitor 42 based on power from the battery 41 when the voltage value of the output voltage of the capacitor 42 has become equal to or lower than a threshold voltage) may also be used in the backup control in the third embodiment.

The charging control of the battery 41 in the third embodiment (that is, control for charging the capacitor 42 based on power from the battery 41 during a period where the supplying of power to the specified load has stopped) may also be used in the backup control in the fourth embodiment.

In the fifth and sixth embodiments, control may be performed to supply power to the load 30 from only the battery 41 (for example, the switching control of the backup power supply 40 in the second embodiment).

In the fifth embodiment, when power is supplied from the capacitor 42 to the load 30, control may be performed to place the switch 517 in the off state and not supply power from the battery 41 to the load 30. By doing so, it is possible to prevent the potential of the power path 22 from depending on the output voltage of the battery 41 when power is supplied from the capacitor 42.

The invention claimed is:

1. A vehicle backup apparatus that performs, in a vehicle power supplying system equipped with a power supply unit that supplies power to a load, a backup operation when supplying of power from the power supply unit has entered a failure state, the vehicle backup apparatus comprising:

a charging/discharging unit for performing charging and discharging of a backup power supply that includes a battery and a capacitor and is a different power source to the power supply unit;

a temperature detection unit for detecting a temperature of the battery; and a control unit for controlling the charging/discharging unit, wherein when the failure state has been entered and a detection temperature of the temperature detection unit is equal to or below a threshold temperature, the control unit causes the charging/discharging unit to perform the backup operation so as to supply power from the capacitor to the load and stop supplying of power from the battery to the load, and when the detection temperature exceeds the threshold temperature, the control unit causes the charging/discharging unit to perform the backup operation so as to supply power based on the battery and the capacitor to the load.

2. The vehicle backup apparatus according to claim 1, wherein when the failure state has been entered, the control unit causes the charging/discharging unit to perform the backup operation so as to supply power from both the battery and power from the capacitor to the load.

3. The vehicle backup apparatus according to claim 1, further comprising:

a power path that acts as a path that supplies power from the power supply unit to the load;

a conductive path provided between the power path and the battery; and a current detection unit that detects a current flowing from the battery to the conductive path, wherein when the failure state has been entered and a current value detected by the current detection unit is equal to or below a threshold current, the control unit causes the charging/discharging unit to perform the backup operation so as to supply power from the battery to the load and stop supplying of power from the capacitor to the load, and when the current value detected by the current detection unit exceeds the threshold current, the control unit causes the charging/discharging unit to perform the backup operation so as to supply both power from the battery and power from the capacitor to the load.

4. The vehicle backup apparatus according to claim 1, further comprising:

wherein when the failure state has been entered and a specified load that is set in advance has entered an operating state, the control unit causes the charging/discharging unit to perform the backup operation so as to supply power from the capacitor to the load.

5. The vehicle backup apparatus according to claim 1, further including;

a power path that acts as a path that supplies power from the power supply unit to the load;

a conductive path provided between the power path and the battery;

a current detection unit that detects a current flowing on the conductive path; and a switch that is provided on the conductive path, enables the conductive path to conduct electricity when the switch is in an on state, and cuts off the conductive path when the switch is in an off state, and wherein when the failure state has been entered and a value of the current detected by the current detection unit exceeds a predetermined value, the control unit switches the switch from the on state to the off state.

6. The vehicle backup apparatus according to claim 1, further including;

a power path that acts as a path that supplies power from the power supply unit to the load, wherein the charging/discharging unit includes:

a first DC-DC converter provided between the power path and the battery; and a second DC-DC converter provided between the power path and the capacitor.

7. The vehicle backup apparatus according to claim 1, further including;

a power path that supplies power from the power supply unit to the load; and a conductive path provided between the power path and the battery;

wherein the charging/discharging unit includes a DC-DC converter provided between the power path and the capacitor, and the battery is connected via the conductive path to the power path.

8. The vehicle backup apparatus according to claim 1, wherein the backup power supply includes a plurality of capacitors, the charging/discharging unit includes a selection unit that selects the capacitors to supply power to the load out of the plurality of capacitors, and the control unit controls the selection unit.

9. The vehicle backup apparatus according to claim 8, wherein the selection unit selects a first selection type that selects a predetermined number of the capacitors and a second selection type that selects a plurality of capacitors in a configuration where a larger number of capacitors than in the first selection type are connected in series, the control unit causes to perform the backup operation based on power from the capacitors selected by the selection unit according to the first selection type and then causes to perform the backup operation based on power from the plurality of capacitors selected by the selection unit according to the second selection type to increase an output voltage outputted from the backup power supply.

10. The vehicle backup apparatus according to claim 1, wherein the control unit causes the charging/discharging unit to charge the capacitor based on power from the battery.

11. The vehicle backup apparatus according to claim 10, wherein the control unit causes the charging/discharging unit to charge the capacitor based on power from the battery during a period where supplying of power from the capacitor to a specified load, which is set in advance, has stopped.

12. The vehicle backup apparatus according to claim 10, further comprising a voltage detection unit for detecting an output voltage of the capacitor, wherein when a voltage detected by the voltage detection unit is equal to or below the threshold voltage, the control unit causes the charging/discharging unit to charge the capacitor based on power from the battery.

13. A vehicle backup apparatus that performs, in a vehicle power supplying system equipped with a power supply unit that supplies power to a load, a backup operation when supplying of power from the power supply unit has entered a failure state, the vehicle backup apparatus comprising:

a charging/discharging unit for performing charging and discharging of a backup power supply that includes a battery and a capacitor and is a different power source to the power supply unit;

a power path that acts as a path that supplies power from the power supply unit to the load;

a conductive path provided between the power path and the battery;

a current detection unit that detects a current flowing from the battery to the conductive path; and a control unit for controlling the charging/discharging unit, wherein when the failure state has been entered and a current value detected by the current detection unit is equal to or below a threshold current, the control unit causes the charging/discharging unit to perform the backup operation so as to supply power from the battery to the load and stop supplying of power from the capacitor to the load, and when the current value detected by the current detection unit exceeds the threshold current, the control unit causes the charging/discharging unit to perform the backup operation so as to supply both power from the battery and power from the capacitor to the load.

14. A vehicle backup apparatus that performs, in a vehicle power supplying system equipped with a power supply unit that supplies power to a load, a backup operation when supplying of power from the power supply unit has entered a failure state, the vehicle backup apparatus comprising:

a charging/discharging unit for performing charging and discharging of a backup power supply that includes a battery and a capacitor and is a different power source to the power supply unit;

a control unit for controlling the charging/discharging unit, wherein when the failure state has been entered and a specified load that is set in advance has entered an operating state, the control unit causes the charging/discharging unit to perform the backup operation so as to supply power from the capacitor to the load.

\* \* \* \* \*